United States Patent [19]

Itoh et al.

[11] Patent Number: 5,006,093
[45] Date of Patent: Apr. 9, 1991

[54] HYDRAULIC CONTROL APPARATUS FOR VEHICLE POWER TRANSMITTING SYSTEM HAVING CONTINUOUSLY VARIABLE TRANSMISSION

[75] Inventors: Hiroshi Itoh, Toyota; Masami Sugaya; Yoshinobu Soga, both of Susono; Kunio Morisawa, Toyota; Ryoji Habuchi, Aichi; Katsumi Kouno, Toyota; Yuji Hattori, Susono, all of Japan

[73] Assignee: Toyota Jidosha Kabushiki Kaisha, Toyota, Japan

[21] Appl. No.: 476,601

[22] Filed: Feb. 7, 1990

[30] Foreign Application Priority Data

Feb. 13, 1989 [JP] Japan .................................. 1-33147
Feb. 13, 1989 [JP] Japan .................................. 1-33150
Feb. 13, 1989 [JP] Japan .................................. 1-33151
Apr. 11, 1989 [JP] Japan .................................. 1-91072

[51] Int. Cl.⁵ .................................................. F16H 11/02
[52] U.S. Cl. ............................................. 474/28; 74/867
[58] Field of Search ................ 474/18, 28, 69, 70; 74/866–868

[56] References Cited

U.S. PATENT DOCUMENTS

| | | | |
|---|---|---|---|
| 4,152,947 | 5/1979 | Van Deursen et al. | 974/28 X |
| 4,403,975 | 7/1984 | Rattunde | 474/28 X |
| 4,565,110 | 1/1986 | Ito | 74/868 |
| 4,594,916 | 6/1986 | Ito et al. | 74/866 |
| 4,628,773 | 12/1986 | Itoh et al. | 74/867 |
| 4,772,249 | 9/1988 | Kouno et al. | 74/868 X |
| 4,857,034 | 8/1989 | Kouno et al. | 474/28 |
| 4,867,732 | 9/1989 | Soga et al. | 474/28 |
| 4,895,552 | 1/1990 | Abo et al. | 474/28 |

FOREIGN PATENT DOCUMENTS

| | | |
|---|---|---|
| 60-95262 | 5/1985 | Japan . |
| 61-103048 | 5/1986 | Japan . |
| 62-196445 | 8/1987 | Japan . |
| 62-196448 | 8/1987 | Japan . |
| 62-196450 | 8/1987 | Japan . |
| 64-49757 | 2/1989 | Japan . |

*Primary Examiner*—Thuy M. Bui
*Attorney, Agent, or Firm*—Oblon, Spivak, McClelland, Maier & Neustadt

[57] ABSTRACT

A hydraulic control apparatus for a vehicle power transmitting system having a continuously variable transmission having a first and a second shaft, a pair of variable-diameter pulleys provided on the shafts, a belt connecting the pulleys, and two hydraulic actuators for changing diameters of the pulleys. The apparatus includes a directional control valve for supplying a fluid from a pressure line to one of the two actuators while discharging the fluid from the other actuator, a first fluid passage connected to the directional control valve, for primarily supplying the fluid from the pressure line to a driving side actuator of the two actuators which is provided on a driving one of the first and second shafts, a second fluid passage connected to the directional control valve, for primarily supplying the fluid from the pressure line to a driven side actuator of the hydraulic actuators, and a flow restrictor for restricting a flow of the fluid through the first fluid passage so that a fluid flow resistance of the first fluid passage is higher than a fluid flow resistance of the second fluid passage.

7 Claims, 21 Drawing Sheets

FIG.23

| | HYDRAULIC CONTROL MODE | 3RD SOLENOID VALVE 330 | 4TH SOLENOID VALVE 346 | LOCK-UP CLUTCH 36 (EXCEPT WHERE SHIFT LEVER IS IN POSITION "R") | REVERSE INHIBIT (WHERE SHIFT LEVER IS IN POSITION "R") | 2ND LINE PRESSURE REDUCING CONTROL |
|---|---|---|---|---|---|---|
| A | LOCK-UP CLUTCH RELEASE | OFF | OFF | OFF | OFF | OFF |
| B | LOCK-UP CLUTCH RAPID RELEASE | OFF | ON | OFF | OFF | OFF |
| C | ACCUMULATOR BACK PRESSURE CONTROL | OFF | DUTY CYCLING | OFF | OFF | OFF |
| D | REVERSE INHIBIT | ON | OFF | ON | ON | OFF |
| E | 2ND LINE PRESSURE REDUCTION | ON | ON | ON | ON | ON |

HYDRAULIC CONTROL APPARATUS FOR VEHICLE POWER TRANSMITTING SYSTEM HAVING CONTINUOUSLY VARIABLE TRANSMISSION

BACKGROUND OF THE INVENTION

1. Field of the Invention

The present invention relates to a hydraulic control apparatus for a power transmitting system for automotive vehicles having a belt-and-pulley type continuously variable transmission.

2. Discussion of the Prior Art

In the art of an automotive vehicle, there is known a power transmitting system having a belt-and-pulley type continuously variable transmission, which includes a first and a second shaft, a pair of variable-diameter pulleys provided on the first and second shafts, respectively, a belt connecting the pulleys, and a pair of hydraulic actuators for changing effective diameters of the pulleys. The transmission is controlled by a hydraulic control apparatus which includes a directional control valve for supplying a working fluid from a pressure line selectively to one of the two hydraulic actuators while discharging the fluid from the other hydraulic actuator, for automatically controlling a speed ratio of the transmission. An example of this type of continuously variable transmission is disclosed in laid-open Publication No. 62-196445 of unexamined Japanese Patent Application.

In a motor vehicle equipped with such a continuously variable transmission whose speed ratio is automatically changed during running of the vehicle, it is desirable that the shifting of the transmission to change the speed ratio for reducing the vehicle running speed be effected rapidly in a comparatively long time, since the shifting is required to increase the driving power of the vehicle. On the other hand, the shifting of the transmission to change the speed ratio for increasing the vehicle speed is desirably effected slowly in a comparatively long time, since this shifting tends to suddenly accelerate the vehicle with a drive force due to inertia of the engine and the associated components, which deteriorates the driving comfort.

In the conventional hydraulic control apparatus, the directional control valve is connected to the driving and driven side actuators (provided on the driving or input and driven or output shafts of the transmission), through respective two fluid passages which have the same resistance to flows of the working fluid therethrough. In this arrangement, the shift-up speed and the shift-down speed of the transmission are the same. That is, the rate at which the speed ratio of the transmission is increased is the same as the rate at which speed ratio is reduced. Thus, the shift-up and shift-down speeds cannot be adequately controlled in the conventional arrangement. Although it is possible to control the rates of flows of the fluid to the driving and driven side actuators to different optimum values, this requires a complicated electric controller for controlling the relevant component or components of the hydraulic circuits.

Laid-open Publication Nos. 62-196448 and 62-196450 of unexamined Japanese Patent Applications disclose a hydraulic control apparatus which includes a shift control valve assembly for controlling the speed ratio of a belt-and-pulley type continuously variable transmission as described above, such that a first and a second line pressure is applied from a first and a second pressure line to one and the other of the driving and driven side hydraulic actuators, respectively. In this hydraulic control apparatus, there is provided a by-pass line which connects the driven side actuator and the second pressure line. The by-pass line is provided with a flow restrictor or a one-way valve, which serves to avoid a drop of the pressure in the driven side actuator due to leakage of the fluid therefrom, and thereby prevent the transmission belt from slipping on the pulleys due to insufficiency of the pressure in the driven side actuator.

The shift control valve assembly may include a two-position directional control valve and a flow control valve whose duty cycle is controlled so as to regulate the rate of flow of the fluid. In this case, the driven side actuator suffers from pressure pulsation which occurs in synchronization with the duty-cycling operation of the flow control valve. This pressure pulsation causes pulsation of the tension of the transmission belt which is determined by the pressure in the driven side actuator. Even if the pressure in the driven side actuator is regulated to an optimum value, the pulsation causes fluctuation of the belt tension, between two values corresponding to the upper and lower peaks of the pressure pulsation of the driven side actuator. This results in reducing the life expectancy of the belt. If the flow restrictor is provided in the by-pass line, as described in the above-identified laid-open Publication No. 62-196448, the flow restrictor should not allow a significant amount of leakage of the fluid from the driven side actuator while the flow control valve is not operated in the duty-cycling manner. This means that the flow restrictor is not sufficiently effective to release the upper peak of the pressure pulsation of the driven side actuator upon duty-cycling operation of the flow control valve. If the one-way valve is provided in the by-pass line, as described in the above-identified laid-open Publication No. 62-196450, the one-way valve is only capable of releasing the upper peak of the pressure pulsation of the driven side actuator, but is not capable of applying the second line pressure to the driven side actuator, so as to compensate for the lower peak of the pulsation.

Laid-open Publication No. 60-95262 discloses a hydraulic control apparatus, wherein a first solenoid coil is used for operating the directional control valve selectively to a first and a second position thereof for increasing or reducing the speed ratio of the transmission, while a second solenoid coil is provided for operating the flow control valve selectively to a first and a second position thereof for changing the speed ratio of the transmission at one of two different rates. The first and second solenoid coils are energized or deenergized so as to control the directional and flow control valves so that the actual speed of the driving or input shaft or the actual speed ratio of the transmission coincides with a desired or target value.

In the hydraulic control apparatus as described above, the speed ratio of the transmission is controlled by applying a first line pressure to one of the driving and driven side actuators and applying a second line pressure lower than the first line pressure to the other of the two actuators, while the tension of the transmission belt is controlled by the second line pressure applied to the driven side actuator If the directional and flow control valves which are controlled by the first and second solenoid coils as described above are used in this case, the spools of these control valves tend to be large-sized and have relatively large masses, which deteriorate the operating response Further, where the flow control valve is operated in the duty-cycling manner so as to continuously change the flow rate of the fluid, the large mass of the spool of the flow control valve is undesirable for the durability of the valve.

Laid-open Publication No. 60-95262 discloses a hydraulic control apparatus, wherein a flow control valve for regulating the rate of change in the speed ratio of the transmission has an open position and a closed position for respectively selecting a first rapid shifting mode and a second slow shifting mode, so that the speed ratio is rapidly changed in the rapid shifting mode, and slowly changed in the slow shifting mode. Further, the duty cycle of the flow control valve is controlled so as to provide a third medium-speed shifting mode in which the speed ratio is changed at a continuously variable rate intermediate between the rates of change in the first and second shifting modes. The speed ratio of the transmission is controlled in a selected one of the first, second and third shifting modes depending upon the amount of the detected control error associated with the speed ratio, so that the control error is zeroed or so that the actual speed ratio coincides with a desired or target speed ratio.

In the above hydraulic control apparatus., the slow shifting mode is selected when the currently detected control error amount is relatively small, and the medium-speed shifting mode is selected when the control error amount is medium. When the control error amount is relatively large, the rapid shifting mode is selected. In the medium-speed shifting mode, the duty cycle at which the flow control valve is operated is determined based on the detected control error amount, according to a predetermined formula or equation.

The flow rate of the fluid regulated by the flow control valve does not effectively vary with a change in the duty cycle of the valve, when the duty cycle is near 0% and 100%. Namely, the duty cycle of the flow control valve has non-controllable ranges in which the flow rate of the fluid regulated by the flow control valve does not change with the duty cycle, as in a controllable range in which the flow rate effectively changes as the duty cycle changes. The non-controllable ranges exist due to inertia of the spool of the flow control valve, inductance of the solenoid coil for operating the flow control valve, viscosity and compressibility of the working fluid, and other factors This causes a problem in controlling the rate of change in the speed ratio of the transmission. For example, if the slow shifting mode is replaced by the medium-speed shifting mode, based on the detected or determined control error, the duty cycle determined based on the control error according to a predetermined formula immediately after the selection of the medium-speed shifting mode does not necessarily accurately correspond to the boundary between the controllable and non-controllable ranges of the duty cycle of the flow control valve. That is, the duty cycle may considerably differ from the value corresponding to the boundary, due to fluctuation in the gain used in the formula. In this case, the flow rate regulated by the flow control valve immediately after the medium-speed shifting mode is selected is considerably different from that at the end of the shifting in the slow shifting mode. This results in a sudden change in the speed of changing the speed ratio, which deteriorates the driving comfort of the vehicle.

SUMMARY OF THE INVENTION

It is therefore an object of the present invention to provide a hydraulic control apparatus for a vehicle power transmitting system including a belt-and-pulley type continuously variable transmission, which apparatus is adapted such that the change in the speed ratio of the transmission so as to increase the vehicle speed is effected at a lower rate or speed than the rate of change in the speed ratio so as to reduce the vehicle speed A second object of the invention is to provide a hydraulic control apparatus for a vehicle power transmitting system having a continuously variable transmission, which apparatus is substantially free from pressure pulsation of the driven side actuator of the transmission, which may occur in synchronization of duty-cycling operation of a flow control valve for regulating the shifting speed of the transmission.

A third object of the invention is to provide a hydraulic control apparatus for a vehicle power transmitting system having a continuously variable transmission, which apparatus uses comparatively small-sized, highly responsive direction control valve and flow control valve, which have improved durability even if the valves are operated in the duty-cycling manner.

It is a fourth object of the invention to provide a hydraulic control apparatus for a vehicle power transmitting system having a continuous variable transmission, which apparatus permits the transmission to be smoothly shifted at an optimum speed, with improved driving comfort of the vehicle.

The first object may be achieved according to a first aspect of the present invention, which provides a hydraulic control apparatus for a power transmitting system for an automotive vehicle having a continuously variable transmission which has a first and a second shaft, a pair of variable-diameter pulleys provided on the first and second shafts, respectively, a belt connecting the pulleys, and a pair of hydraulic actuators for changing effective diameters of the pulleys, the apparatus including a directional control valve for supplying a working fluid from a pressure line to one of the pair of hydraulic actuators while discharging the working fluid from the other hydraulic actuator, in order to control a speed ratio of the transmission, the hydraulic control apparatus comprising: (a) a first fluid passage connected to the directional control valve, for primarily supplying the working fluid from the pressure line to a driving side actuator of the pair of hydraulic actuators which is provided on a driving one of the first and second shafts; (b) a second fluid passage connected to the directional control valve, for primarily supplying the working fluid from the pressure line to a driven side actuator of said pair of hydraulic actuators; and (c) flow restrictor means for restricting a flow of the fluid through the first fluid passage so that a fluid flow resistance of the first fluid passage is higher than a fluid flow resistance of the second fluid passage.

In the hydraulic control apparatus of the present invention described above, the first fluid passage is provided exclusively or at least primarily for supplying the fluid from the pressure line to the driving side actuator of the continuously variable transmission, while the second fluid passage is provided exclusively or at least primarily for supplying the fluid from the pressure line to the driven side actuator. The resistance to the fluid flow through the first fluid passage is increased by the flow restrictor means, as compared with the fluid flow resistance of the second fluid passage, so that the rate of the fluid flow from the directional control valve to the driving side actuator to increase the speed ratio of the continuously variable transmission is comparatively restricted by the flow restrictor means. Namely, the transmission is shifted up at a rate lower than the rate at which the transmission is shifted down to reduce the speed ratio. Thus, the present hydraulic control apparatus adapted to restrict shift-up speed of the transmission does not require a complicated control device for changing the rates of flows of the fluid to the driving and driven side actuators for increasing and reducing the speed ratio of the transmission at the optimum rates. Accordingly, the present hydraulic control apparatus may use a relatively simple electrical control arrangement for controlling the shift-up and shift-down speeds of the transmission.

Preferably, a flow control valve is provided between the directional control valve and the two hydraulic actuators (driving and driven side actuators), and the flow restrictor means consists of a flow restrictor disposed in the first fluid passage which connects the directional control valve and the flow control valve. In this case, a second flow restrictor is desirably provided in a line connecting the flow control valve and the driving side actuator. The provision of this second flow restrictor is desirable when the line connecting the flow control valve and driving side actuator is connected by a branch line to a pressure regulating valve which regulates the pressure in the pressure line. The pressure in the driving side actuator is applied through the branch line to the pressure regulating valve, as a pilot pressure for controlling the line pressure in the pressure line so that the line pressure is higher than the pressure in the driving side actuator. Since the line pressure regulated by the pressure regulating valve is higher than the pressure in the driving side actuator, a pressure pulsation may be produced upon duty-cycling operation of the flow control valve. However, the second flow restrictor disposed between the flow control valve and the point of connection of the branch line functions to prevent the pressure pulsation from being transmitted to the pressure regulating valve, whereby the pulsation of the line pressure may be avoided.

The second object may be achieved according to a second aspect of the present invention, which provides a hydraulic control apparatus for a power transmitting system for an automotive vehicle having a continuously variable transmission which has an input and an output shaft, a pair of variable-diameter pulleys provided on the input and output shafts, respectively, a belt connecting the pulleys, and a first and a second hydraulic actuator which are provided on said input and output shafts, respectively, for changing effective diameters of the pulleys, the apparatus including a two-position directional control valve having a first and a second position, for applying a first line pressure from a first pressure line to one of the first and second hydraulic actuators while applying a second line pressure from a second pressure line to the other of the hydraulic actuators, and a two-position flow control valve disposed between the directional control valve and the pair of hydraulic actuators and whose duty cycle is controlled so as to control a rate of flow of a working fluid therethrough, whereby a speed ratio of the transmission is changed at a controlled rate, the apparatus comprising: (a) a by-pass line connecting the second pressure line to said second hydraulic actuator provided on a driven one of the first and second shafts; (b) a one-way valve disposed in the by-pass line, for permitting a flow of the fluid therethrough in a direction from the second pressure line toward the second hydraulic actuator; and (c) a flow restrictor disposed in the by-pass line, in parallel with the one-way valve.

In the hydraulic control apparatus constructed according to the second aspect of the invention described above, the by-pass line connecting the second pressure line and the second hydraulic actuator is provided with the one-way valve and the flow restrictor which are connected in parallel with each other. The one-way valve permits only the fluid flow toward the second hydraulic actuator. This arrangement minimizes the pulsation of the pressure in the second hydraulic actuator, which may take place in synchronization with the duty-cycling operation of the flow control valve. More specifically, the flow restrictor functions to release the upper peak of the spike of the pulsation of the pressure in the second actuator. Further, the one-way valve functions to instantaneously supply the fluid from the second pressure line to the second side actuator, so as to compensate for a drop of the pressure in the second actuator, contributing to raising the lower peak of the pressure pulsation. Thus, the pulsation is minimized, to eliminate the deterioration of the durability of the belt of the transmission due to the pulsation. It is also noted that the fluid supply to the second actuator through the one-way valve eliminates a drop of the pressure in the second actuator due to leakage of the fluid therefrom.

The one-way valve preferably has a seat having a flat surface, a valve member having a flat operating surface abutable on the surface of the seat, and a biasing member for biasing the valve member against the seat. During the duty cycling operation of the flow control valve, the valve member abuts on the seat repeatedly in synchronization with the duty-cycling operation. However, this one-way valve having the flat seat and valve member is more durable than a valve having a spherical valve member.

The third object indicated above may be attained according to a third aspect of the present invention, which provides a hydraulic control apparatus for a power transmitting system for an automotive vehicle having a continuously variable transmission which has a first and a second shaft, a pair of variable-diameter pulleys provided on the first and second shafts, respectively, a belt connecting the pulleys, and a pair of hydraulic actuators for changing effective diameters of the pulleys, the apparatus including means for applying a first line pressure and a second line pressure lower than the first line pressure to one and the other of the pair of hydraulic actuators, respectively, so as to control a speed ratio of the transmission, the apparatus comprising: (a) a two-position directional control valve having a first and a second position for increasing and reducing the speed ratio of the transmission, respectively; (b) a first solenoid coil for operating the directional control valve selectively to the first and second positions; (c) a two-position flow control valve disposed between the directional control valve and the pair of hydraulic actuators, and having a first and a second position for changing the speed ratio of the transmission at respective two different rates; and (d) a second solenoid coil for operating the flow control valve selectively to the first and second positions. The directional control valve has a drain port, a first line pressure port receiving the first line pressure, a second line pressure port receiving the second line pressure, four ports respectively connected to a first, a second, a third and a fourth connecting line, a spool having four lands for connecting the drain port and the first connecting line and connecting the first line pressure port and the third connecting line when the first solenoid coil is placed in one of energized and deenergized states thereof, and for connecting the first line pressure port and the second connecting line and connecting the second line pressure port and the fourth connecting line when the first solenoid coil is placed in the other of the energized and deenergized states. On the other hand, the flow control valve has a port communicating with the driving side actuator, a port communicating with a driven side actuator of the pair of hydraulic actuator which is provided on a driven one of the first and second shafts, four ports respectively connected to the first, second, third and fourth connecting lines, and a spool having three lands, for connecting the first connecting line and the driving side actuator and connecting the third connecting line and the driven side actuator when the second solenoid coil is placed in one of energized and deenergized states thereof, and for connecting the second connecting line and the driving side actuator and connecting the fourth connecting line and the driven side actuator when the second solenoid coil is placed in the other of the energized and deenergized states In this hydraulic control apparatus, the speed ratio of the transmission is reduced so as to decelerate the vehicle when the first solenoid coil is placed in one of the open and closed position. When the first solenoid coil is placed in the other of the two positions, the speed ratio is increased so as to accelerate the vehicle. Further, the rate of increase in the speed ratio is restricted while the rate of decrease in the speed ratio is not restricted when the second solenoid coil is placed in one of the energized and deenergized states. When the second solenoid coil is placed in the other position, the rate of increase in the speed ratio is not restricted while the rate of decrease in the speed ratio is restricted. In the present arrangement, the spool of the directional control valve has only four lands, and the spool of the flow control valve has only three lands. These relatively small numbers of the lands provided on the spools permit the directional and flow control valves to be comparatively small-sized and provide improved operating response. The reduced mass of the spool of the flow control valve assures improved durability of the flow control valve, which is operated in the duty-cycling manner as needed.

The fourth object indicated above may be attained according to a further aspect of the invention, which provides a hydraulic control apparatus for a power transmitting system for an automotive vehicle having a continuously variable transmission, hydraulic actuator means for controlling a speed ratio of the transmission, and a two-position flow control valve connected to the hydraulic actuator means, for regulating a rate of flow of a working fluid therethrough so as to control a rate of change in the speed ratio, the flow control valve having an open and a closed position for respectively selecting a first rapid and a second slow shifting mode in which the speed ratio of the transmission is rapidly and slowly changed, respectively, a duty cycle of the flow control valve being controlled so as to provide a third medium-speed shifting mode in which the speed ratio is changed at a continuously variable rate intermediate between rates of change in the first and second shifting modes, the speed ratio of the transmission being controlled in a selected one of at least two of the first, second and third shifting modes, so that a control error associated with the speed ratio is zeroed, the present hydraulic control apparatus comprising: (a) means for determining the control error; (b) means for determining a duty cycle at which the flow control valve is operated so as to zero the detected control error; (c) means for determining at least one boundary duty cycle value each substantially corresponding to a boundary between a controllable range and a non-controllable range of the rate of flow of the fluid through the flow control valve, the rate of flow of the fluid effectively varying with the duty cycle of the flow control valve over the controllable range, and not effectively varying with the duty cycle within the non-controllable range; and (d) mode selecting means for selecting one of at least two of the first, second and third shifting modes, by comparing the determined duty cycle with the at least one boundary duty cycle value.

In the hydraulic control apparatus described just above, the amount of control error for controlling the speed ratio is determined, and compared with the boundary duty cycle value or values each of which substantially corresponds to the boundary between the controllable and non-controllable ranges of the rate of fluid flow through the flow control valve. Based on the comparison, an optimum shifting mode is selected from among at least two of the first, second and third shifting modes in which the speed ratio of the transmission is changed at different speeds. Suppose the shifting mode is changed from the slow shifting mode to the medium-speed shifting mode, for example, in the present arrangement, the duty cycle of the flow control valve which is determined based on the determined control error according to a predetermined suitable formula immediately after the change of the shifting mode is equal to a value which corresponds to the boundary between the controllable and non-controllable ranges of the rate of flow of the fluid through the flow control valve. Accordingly, even if a gain used in the formula for determining the duty cycle of the flow control valve fluctuates in relation to the vehicle running speed or other parameters, the fluid flow rate immediately after the medium-speed shifting mode is selected is not different from that immediately before the slow shifting mode is changed to the medium-speed shifting mode. Thus, the present hydraulic control apparatus assures smooth shifting operations of the continuously variable transmission, without a sudden change in the fluid flow rate of the flow control valve upon switching of the shifting mode from one mode to another, which would deteriorate the driving comfort of the vehicle.

BRIEF DESCRIPTION OF THE DRAWINGS

The above and other objects, features and advantages of the present invention will become more apparent by reading the following detailed description of presently preferred embodiments of the present invention, when considered in conjunction with the accompanying drawings, in which:

FIG. 23 is a view showing on-off states of the third and fourth solenoid valves in different hydraulic control modes A, B, C, D and E;

DETAILED DESCRIPTION OF THE PREFERRED EMBODIMENTS

Figure 1:
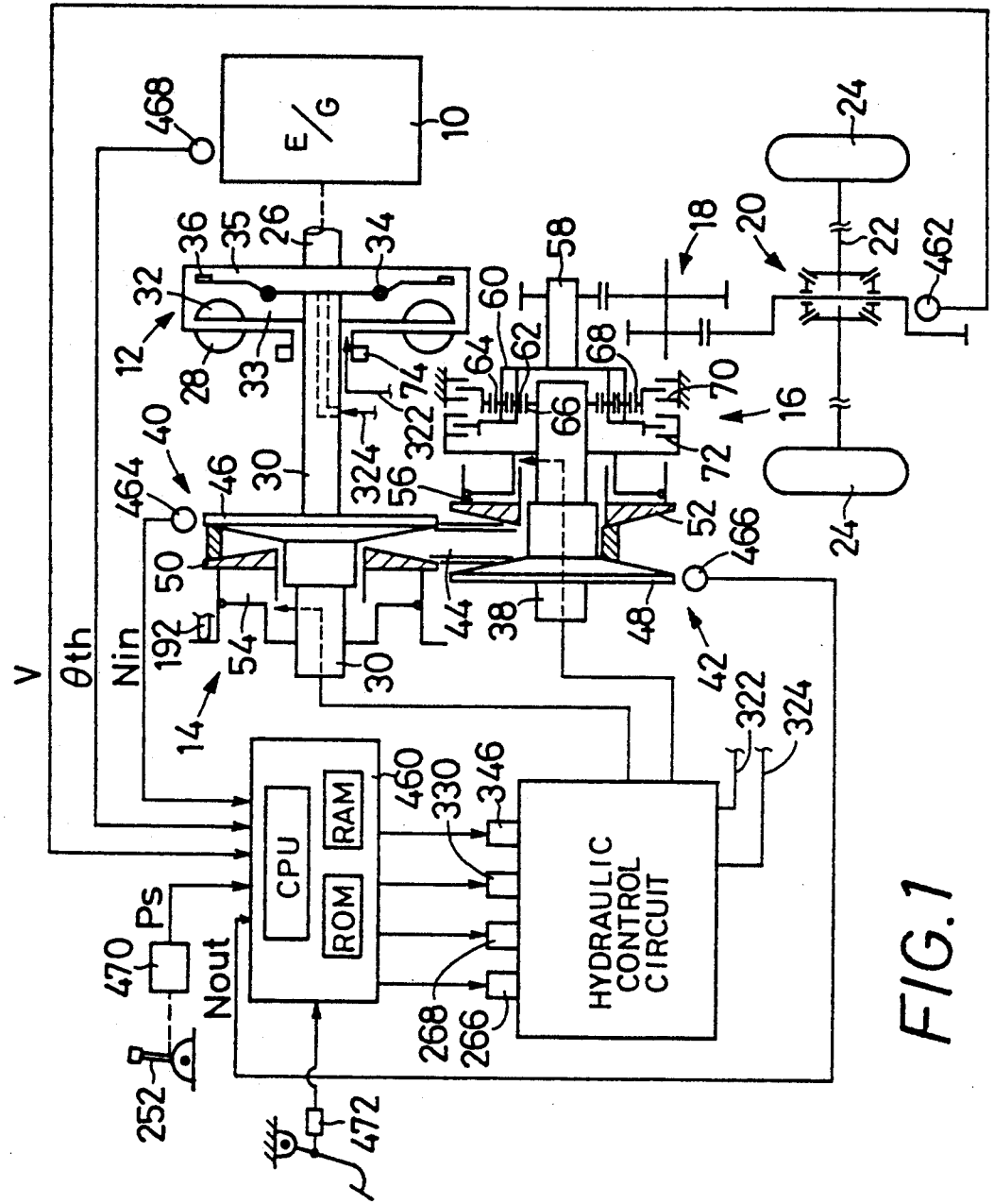
FIG. 1 is a schematic view of a vehicle power transmitting system equipped with a hydraulic control apparatus constructed according to one embodiment of the present invention.

Referring first to FIG. 1, there is illustrated a power transmitting system of an automotive vehicle, for transmitting power from an engine 10 to drive wheels 24, 24. The power transmitting system includes: a fluid coupling 12 connected to the engine 10 through a crankshaft 26 and equipped with a lock-up clutch 36; a continuously variable transmission (hereinafter referred to as "CVT") 14 connected to the fluid coupling 12; a reversing device 16 connected to the CVT 14, for selecting a forward or a reverse running of the vehicle, an intermediate gear device 18 connected to the reversing device 16; a differential gear device 20 connected to the intermediate gear device 18; and a drive axle 22 connected to the differential gear device 20 and drive wheels 24.

The fluid coupling 12 includes a pump impeller 28 connected to the crankshaft 26 of the engine 10; a turbine impeller 32 which is fixed to an input shaft 30 of the CVT 14 and rotated by means of a working fluid from the pump impeller 28; the lock-up clutch 36 indicated above, which is fixed to the input shaft 30 through a damper 34; and means for defining an engaging chamber 33 communicating with an engaging line 322 (which will be described), and a releasing chamber 35 communicating with a releasing line 324 (which will be described). The fluid coupling 12, which is filled with the working fluid, is operated to effect engagement of the lock-up clutch 36 for direct connection of the crankshaft 26 to the input shaft 30, when the speed of the vehicle, engine 10 or pump impeller 28, for example, exceeds a predetermined value. In this case, the fluid is fed into the engaging chamber 33 while the fluid in the releasing chamber 35 is discharged. When the vehicle speed or other speed indicated above falls below the predetermined value, on the other hand, the lock-up clutch 36 is disengaged or released such that the fluid is fed into the releasing chamber 35 and discharged from the engaging chamber 33.

The CVT 14 has a pair of variable-diameter pulleys 40, 42 having a same diameter which are provided on the input shaft 30 and an output shaft 38, respectively. These pulleys 40, 42 are connected by a transmission belt 44, and have respective stationary rotors 46, 48 fixed to the respective input and output shafts 30, 38, and respective axially movable rotors 50, 52 which are axially movable on the respective shafts 30, 38 and rotated with these shafts. The movable rotors 50, 52 are moved by respective first and second hydraulic actuators in the form of first and second hydraulic cylinders 54, 56, whereby the effective widths of V grooves of the pulleys 40, 42, i.e., the effective diameters engaging the belt 44 are changed, to change a speed ratio "e" of the CVT 14 (speed Nout/Nin, where Nout=speed of the output shaft 38, and Nin=speed of the input shaft 30).

Since the variable-diameter pulleys 40, 42 have the same diameter, the corresponding first and second hydraulic cylinders 54, 56 have a same pressure-receiving area. Generally, the tension of the transmission belt 44 is determined primarily by the pressure in one (hereinafter referred to as "driven side cylinder") of the first and second hydraulic cylinders 54, 56 which corresponds to the driven one of the pulleys 40, 42 (hereinafter referred to as "driven side pulley"). The driven side cylinder 54 or 56 is supplied with a second line pressure Pl2 which is adjusted by a second pressure regulating valve 102 (which will be described), whereby the tension of the belt 44 is adjusted to within an optimum range in which the belt 44 does not slip on the pulleys 40, 42.

The reversing device 16 is a well known double-pinion type planetary gear mechanism, which includes: a carrier 60 fixed on an output shaft 58; a pair of planetary gears 62, 64 which are rotatably supported by the carrier 60 and which mesh with each other; a sun gear 66 which is fixed on the input shaft 38 (output shaft of the CVT 14) and which meshes with the inner planetary gear 62; a ring gear 68 meshing with the outer planetary gear 64; a REVERSE brake 70 for stopping the rotation of the ring gear 68; and a FORWARD clutch 72 for connecting the carrier 60 and the input shaft 38.

The REVERSE brake 70 and FORWARD clutch 72 are hydraulically operated, frictionally coupling devices. The reversing device 16 is placed in a neutral position thereof when the brake 70 and the clutch 72 are both in the disengaged or released positions. In this state, the reversing device 16 does not transmit power to the intermediate gear device 18. When the FORWARD clutch 72 is engaged, the output shaft 38 (input shaft of the device 16) of the CVT and the output shaft 58 of the device 16 are connected to each other, whereby power is transmitted from the CVT 14 to the intermediate gear device 18, so as to run the vehicle in the forward direction. When the REVERSE brake 70 is engaged, on the other hand, the direction of rotation of the output shaft 58 of the reversing device 16 is reversed with respect to the direction of rotation of the output shaft 38 of the CVT 14, whereby power is transmitted so as to run the vehicle in the reverse direction.

Figure 2:
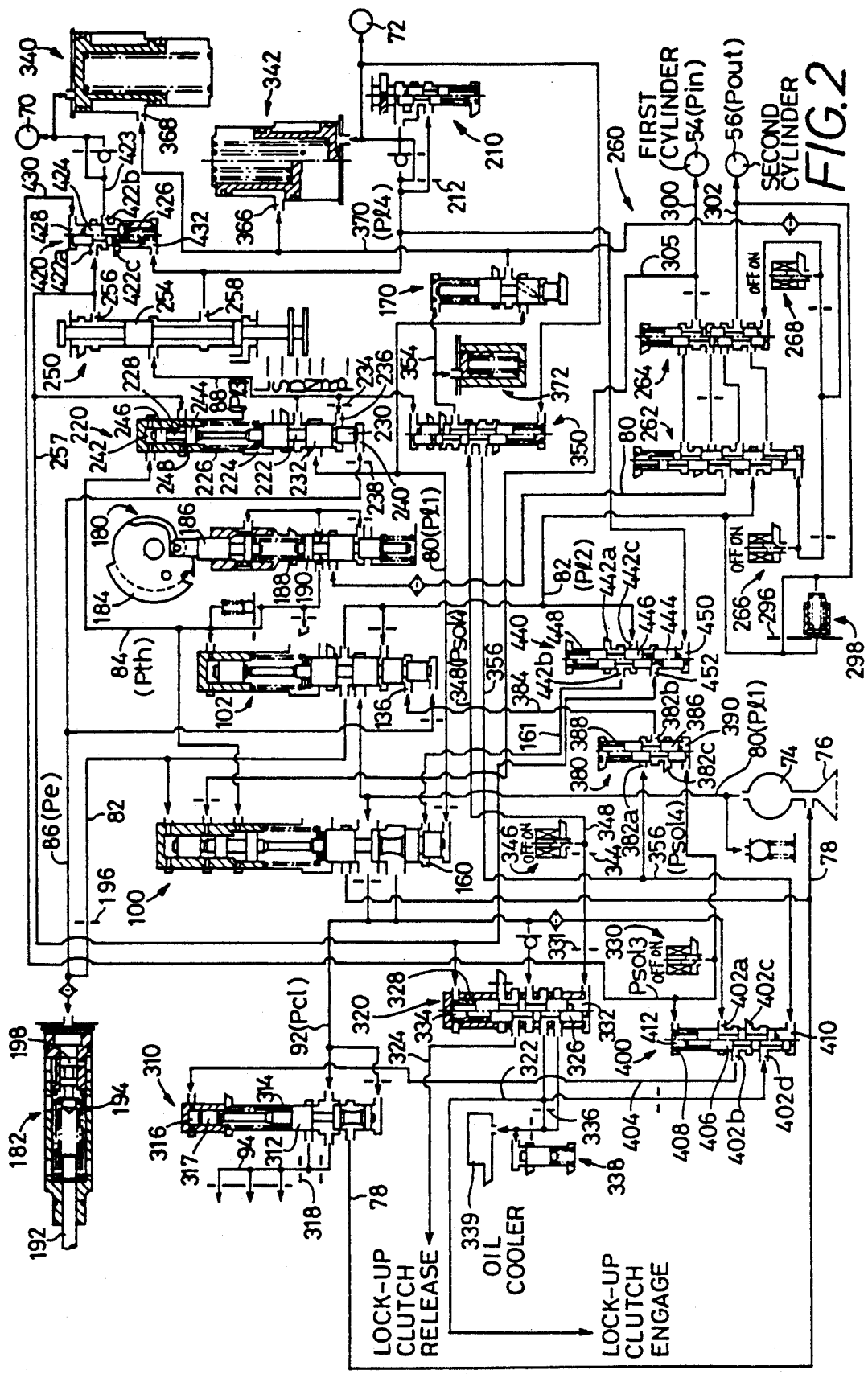
FIG. 2 is a hydraulic circuit diagram showing the hydraulic control apparatus adapted to control the power transmitting system of FIG. 1.

Referring next to FIG. 2 showing a hydraulic control circuit for controlling the vehicle power transmitting system of FIG. 1, reference numeral 74 designates an oil pump serving as a hydraulic power source of the hydraulic system, which constitutes a part of a hydraulic control apparatus constructed according to the instant embodiment of the present invention, which will be described. The oil pump 74 is connected to the pump impeller 28 of the fluid coupling 12, whereby the pump 74 is always rotated with the crankshaft 26 of the engine 10. In operation, the pump 74 pumps up a working fluid through a strainer 76 from a reservoir to which the fluid is returned. The pump 74 also communicates with a suction line 78, so that the fluid returned through the suction line 78 is sucked into the pump 74. The pressurized fluid produced by the pump 74 is delivered as a first line pressure Pl1 into a first pressure line 80. In the present embodiment, the first line pressure Pl1 is regulated by an overflow or relief type first pressure regulating valve 100, which discharges the fluid in the first pressure line 80 into the suction line 78 and a lock-up clutch line 92. The first line pressure Pl1 is lowered by the above-indicated second pressure regulating valve 102, to produce the above-indicated second line pressure Pl2 in a second pressure line 82. The second pressure regulating valve 102 is of a pressure reducing type, contrary to the overflow type of the first pressure regulating valve 100.

Figure 3:
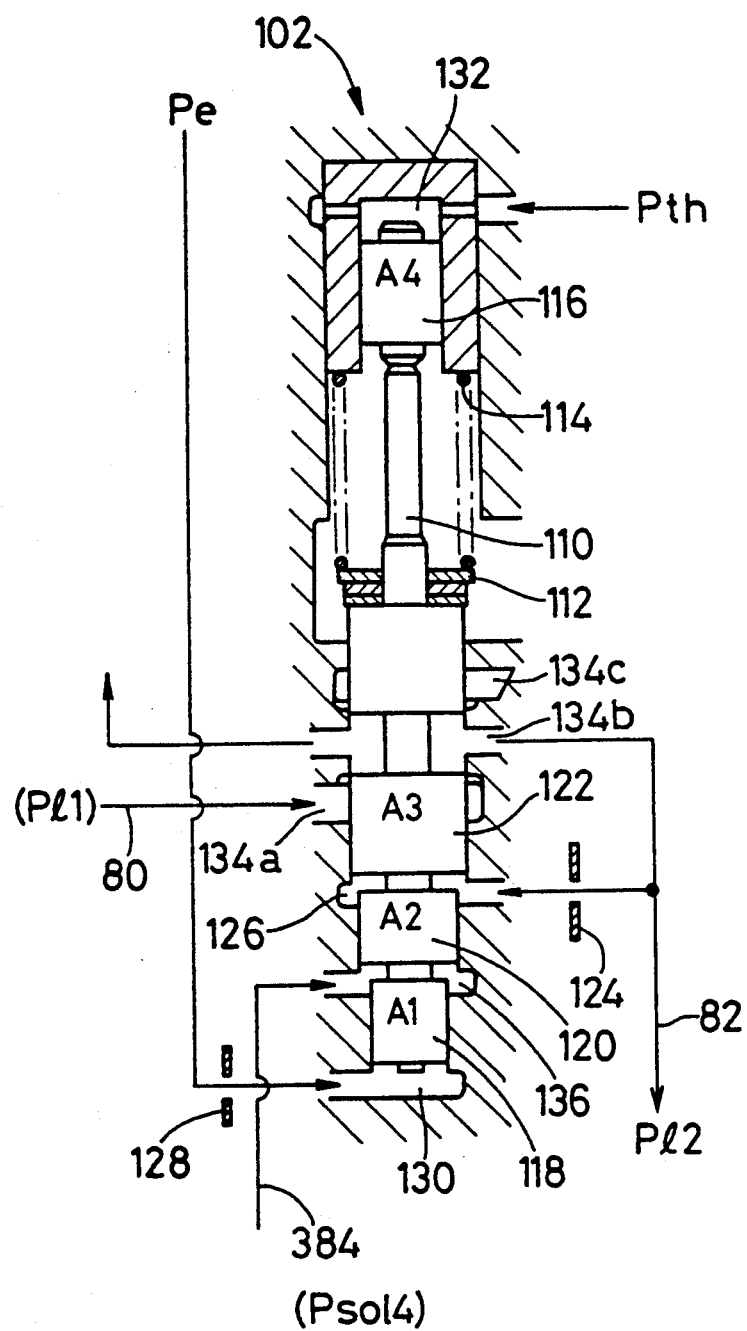
FIG. 3 is a view illustrating in detail a second pressure regulating valve incorporated in the apparatus of FIG. 2.

The second pressure regulating valve 102 will be first described in detail, by reference to FIG. 3.

This pressure regulating valve 102 includes a valve spool 110 for effecting connection and disconnection of the first pressure line 80 to and from the second pressure line 82, a spring sheet 112, a return spring 114, and a plunger 116. The valve spool 110 is provided at one axial end portion thereof remote from the plunger 116, with a first, a second and a third land 118, 120 and 122, which have different diameters. The first land 118 at the extreme end of the spool 110 has the smallest diameter, while the axially innermost third land 118 has the larger diameter. Between the second and third lands 120, 122, there is formed a chamber 126 to which is applied as a feedback pressure the second line pressure Pl2 through a flow restrictor 124, so that the valve spool 110 is biased toward its closed position by the second line pressure Pl2. Another chamber 130 is formed adjacent to the first land 118 at the above-indicated one end of the valve spool 110. To this chamber 130, there is applied a SPEED-RATIO pressure Pe (which will be described) through a flow restrictor 128. This pressure Pe also biases the valve spool 110 toward the closed position.

The return spring 114 disposed around the valve spool 110 biases the spool 110 toward its open position, through the spring sheet 112. The second pressure regulating valve 102 has another chamber 132 adjacent to the plunger 116. This chamber 132 is adapted to receive a THROTTLE pressure Pth which will be described. The valve spool 110 is positioned under equilibrium of forces according to the following equation (1):

$$Pl2 = (A4 \cdot Pth + W - A1 \cdot Pe)/(A3 - A2) \quad (1)$$

where,
A1: pressure-receiving area of the first land 118
A2: cross sectional area of the second land 120
A3: cross sectional area of the third land 122
A4: pressure-receiving area of the plunger 116
W: biasing force of the return spring 114

Figure 7:
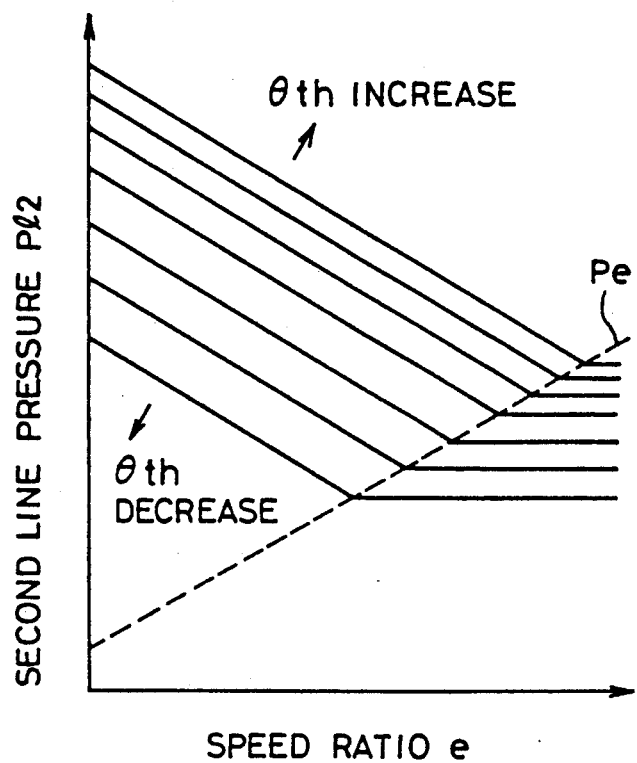
FIG. 7 is a graph showing an output characteristic of the second pressure regulating valve of FIG. 3.

Namely, the valve spool 110 is axially moved according to the equation (1), so as to repeatedly alternately establish communication between a port 134a and a port 134b for permitting a flow of the fluid from the first pressure line 80 into the second pressure line 82, and communication between the port 134b and a drain port 134c for draining the second pressure line 82 through the drain port 134c. As a result, the second line pressure Pl2 is produced. Since the second pressure line 82 is a closed hydraulic circuit, the second line pressure Pl2 can be adjusted by the second pressure regulating valve 102, by lowering the relatively high first line pressure Pl1, as indicated in FIG. 7.

Between the first and second lands 118, 120 of the valve spool 110 of the second pressure regulating valve 102, there is formed a chamber 136 adapted to receive a PRESSURE REDUCING pilot pressure Psol4 through a second line pressure reducing control valve 380 which will be described. As the valve spool 110 is biased toward its closed position by the pilot pressure Psol4, the second line pressure Pl2 is accordingly reduced. This reduction in the second line pressure will be described later in more detail. The chamber 136 will be referred to as a pressure-reducing chamber, when appropriate, for the reason which will become apparent.

Figure 4:
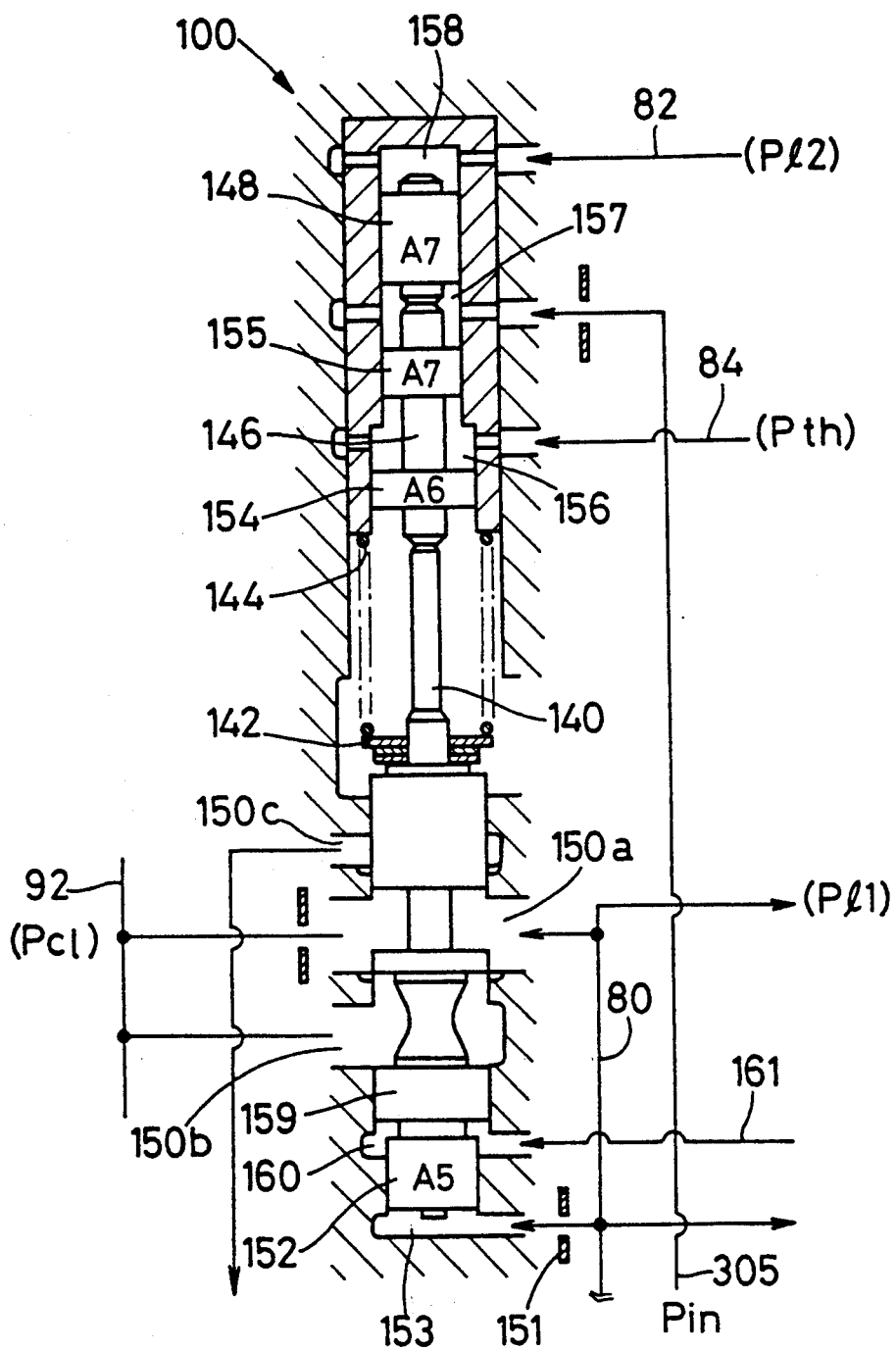
FIG. 4 is a view illustrating in detail a first pressure regulating valve also incorporated in the apparatus of FIG. 2.

Referring next to FIG. 4, the first pressure regulating valve 100 will then be described. This valve 100 includes a valve spool 140, a spring sheet 142, a return spring 144, a first plunger 146, and a second plunger 148 whose diameter is the same as a second land 155 of the first plunger 146. The valve spool 100 is operated to effect selective connection and disconnection of a port 150a communicating with the first pressure line 80, to and from a drain port 150b or 150c. The valve spool 140 has a first land 152 at one axial end thereof remote from the first and second plungers 146, 148. Adjacent to the first land 152 of the spool 140, there is formed a chamber 153 which receives as a feedback pressure the first line pressure Pl1 through a flow restrictor 151. The valve spool 140 is biased toward its closed position by this first line pressure P(1. The first plunger 146, which is coaxial with the valve spool 140, has a first land 154 which cooperates with the above-indicated second land 155 to define a chamber 156 adapted to receive the THROTTLE pressure Pth. Between the second land 155 of the first plunger 146 and the second plunger 148, there is formed a chamber 157 adapted to receive a pressure Pin in the first hydraulic cylinder 54, through a branch line 305. Further, a chamber 158 is formed adjacent to the end face of the second plunger 148. The chamber 158 receives the second line pressure Pl2. The biasing force of the above-indicated return spring 144 acts on the valve spool 140 through the valve sheet 142 so as to bias the spool 140 toward its open position. The valve spool 140 is positioned under equilibrium of forces according to the following equation (2):

$$Pl1 = [(Pin \text{ or } Pl2) \cdot A7 + Pth(A6 - A7) + W]/A5 \quad (2)$$

where,
- A5: pressure-receiving area of the first land 152 of the valve spool 140
- A6: cross sectional area of the first land 154 of the first plunger 146
- A7: cross sectional area of the second land 155 of the first plunger 146 (second plunger 148)
- W: biasing force of the return spring 144

In the first pressure regulating valve 100, the first and second plungers 146, 148 are separated from each other and a thrust due to the pressure Pin in the first cylinder 54 acts on the valve spool 140 in the direction toward the closed position, when the pressure Pin is higher than the second line pressure Pl2 (which is normally equal to the pressure Pout in the second cylinder 56. When the pressure Pin is lower than the second line pressure Pl2, the first and second plungers 146, 148 are held in abutting contact with each other, whereby a thrust due to the second line pressure Pl2 acting on the end face of the second plunger 148 acts on the valve spool 140 in the direction toward its closed position. That is, the second plunger 148 receiving the pressure Pin and the second line pressure Pl2 applies to the spool 140 a force based on the higher one of the pressures Pin and Pl2, so that the spool 140 is biased toward its closed position.

Between the first and second lands 152 and 159 of the valve spool 140, there is formed a chamber 160 adapted to receive the second line pressure Pl2 which is applied through a line 161 from a first line pressure reducing control valve 440 (which will be described). The pressure Pl2 in this chamber 160 acts on the valve spool 140 in a direction that causes the first line pressure Pl1 to be lowered. When the control valve 440 is operated to apply the second line pressure Pl2 to the chamber 160 while a shift lever 252 (FIG. 1) of the vehicle is placed in an operating position "N" (NEUTRAL) or "P" (PARKING), the first line pressure Pl1 is lowered. This reduction in the first line pressure will be described later in more detail.

Figure 5:
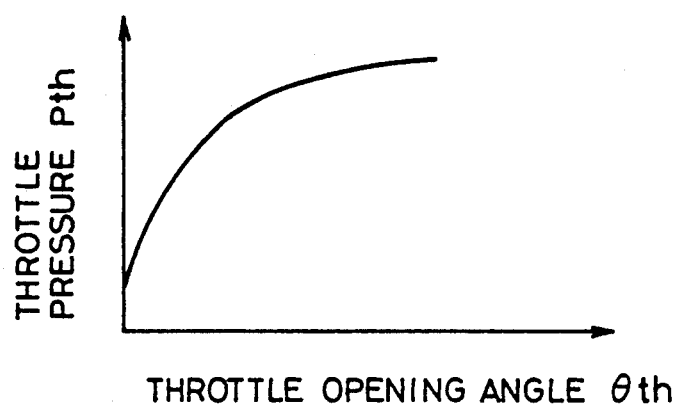
FIG. 5 is a graph indicating an output characteristic of a flow restrictor sensing valve incorporated in the apparatus of FIG. 2.

Referring back to FIG. 2, the THROTTLE pressure Pth representing an actual opening angle θth of a throttle valve of the engine 10 is generated by a flow restrictor sensing valve 180. Further, the SPEED-RATIO pressure Pe representing an actual speed ratio "e" of the CVT 14 is generated by a speed-ratio sensing valve 182. Described specifically, the throttle sensing valve 180 includes: a cam 184 rotated as the throttle valve is operated; a plunger 186 which engages a cam surface of the cam 184 and which is axially moved by a distance corresponding to an angle of rotation of the cam 184; a spring 188; and a valve spool 190 which receives a thrust through the spring 188 from the plunger 186, and a thrust due to the first line pressure Pl1. These two thrust forces act on the spool 190 in the opposite directions. The valve spool 190 is moved to a position of equilibrium of the above two thrust forces, whereby the first line pressure Pl1 is reduced so as to produce the THROTTLE pressure Pth corresponding to the actual opening angle θth of the throttle valve. The relationship between the THROTTLE pressure Pth and the opening angle θth is indicated in the graph of FIG. 5. The THROTTLE pressure Pth is applied through a line 84 to the above-described first and second pressure regulating valves 100, 102, and to a third pressure regulating valve 220.

Figure 6:
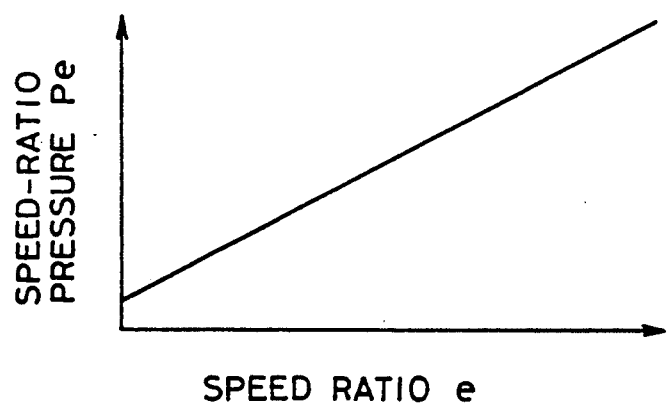
FIG. 6 is a graph indicating an output characteristic of a speed-ratio sensing valve incorporated in the apparatus of FIG. 2.

The speed-ratio sensing valve 182 includes: a sensing rod 192 which slidably contacts the axially movable rotor 50 on the input shaft 30 of the CVT 14 and which is axially displaced by a distance equal to an amount of axial movement of the movable rotor 50; a spring 194 whose biasing force varies as the axial position of the rod 192 is changed; and a valve spool 198 which receives the biasing force of the spring 194 and the second line pressure Pl2. The valve spool 196 is moved to a position of equilibrium of the biasing force of the spring 194 and a thrust force based on the second line pressure Pl2, whereby the amount of discharge flow of the fluid from the second pressure line 82 into the drain is adjusted depending upon the speed-ratio "e" of the CVT 14. For example, as the movable rotor 50 is moved toward the stationary rotor 46 so as to reduce the effective width of the V-groove of the pulley 40 and thereby increase the speed ratio "e", the sensing rod 192 is moved in a direction to compress the spring 194, thereby reducing the rate of flow of the fluid which is supplied from the second pressure line 82 through an orifice 196 and discharged into the drain by a resulting movement of the valve spool 198. As a result, the pressure in a portion of the line 82 downstream of the orifice 196 is increased. This pressure is utilized as the SPEED-RATIO pressure Pe, which increases with an increase in the speed ratio "e" of the CVT 14, as indicated in the graph of FIG. 6. The pressure Pe is applied through a line 86 to the second and third pressure regulating valves 102 and 220.

Figure 8:
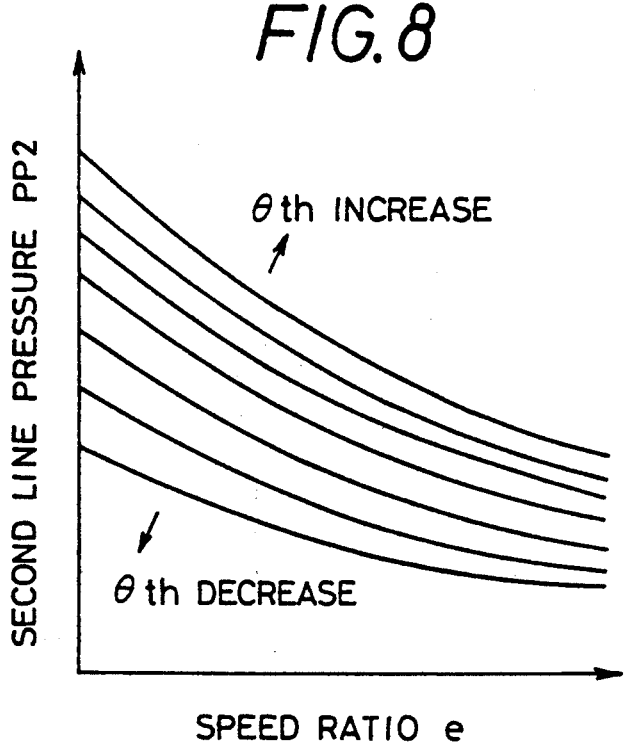
FIG. 8 is a graph showing an ideal relationship of a second line pressure of the apparatus of FIG. 2 with a speed ratio of a CVT of the power transmitting system and an opening angle of a flow restrictor valve of the vehicle.

It will be understood from the above description of the speed-ratio sensing valve 182 that since the SPEED-RATIO pressure Pe is produced by changing the amount of discharge of the fluid supplied from the second pressure line 82 through the orifice 196, the pressure Pe will not exceed the second line pressure Pl2. Further, the second line pressure Pl2 is lowered with an increase in the pressure Pe, by the second pressure regulating valve 102 according to the equation (1) indicated above. Therefore, when the pressure Pe increases up to the level of the second line pressure Pl2, both of the pressures Pe and Pl2 are held constant, as indicated in the graph of FIG. 7, which shows that the lower limit of the second line pressure Pl2 adjusted by the second pressure regulating valve 102 is determined by the SPEED-RATIO pressure Pe, i.e., the speed ratio "e" of the CVT 14. Namely, the present hydraulic arrangement assures the curve of the second line pressure Pl2 (as indicated in FIG. 7) which is similar or approximate to an ideal curve as shown in FIG. 8 that permits the tension of the belt 44 to be maintained at an optimum value. In other words, the present hydraulic arrangement does not require an electromagnetically operated pressure control servo valve controlled by a microcomputer for controlling the second line pressure Pl2. In this respect, the present hydraulic control apparatus provides significant reduction in the cost of manufacture.

The third pressure regulating valve 220 is adapted to produce a third line pressure Pl3 suitable for operating the REVERSE brake 70 and FORWARD clutch 72 of the reversing device 16. This valve 220 includes a valve spool 222 for effecting selective connection and disconnection of the first pressure line 80 to and from a third pressure line 88, a spring sheet 224, a return spring 226, and a plunger 228. The valve spool 222 has a first and a second land 230, 232, between which is formed a chamber 236, which is adapted to receive the third line pressure Pl3 as a feedback pressure through a flow restrictor 234, so that the spool 222 is biased toward its closed position by the pressure Pl3. Adjacent to the first land 230 of the spool 222, there is formed another chamber 240 which receives the SPEED-RATIO pressure Pe through a flow restrictor 238, so that the spool 222 is biased toward the closed position by the pressure Pe. In the third pressure regulating valve 220, a biasing force of the return spring 226 acts on the spool 222 through the spring sheet 224, so that the spool 222 is biased toward its open position by the spring 226. Adjacent to the end face of the plunger 228, there is formed a chamber 242 adapted to receive the THROTTLE pressure Pth, so that the spool 222 is biased toward the open position by the pressure Pth. The plunger 228 has a first land 244, and a second land 246 having a smaller diameter than the first land 244. Between these first and second lands 244, 246, there is formed a chamber 248 adapted to receive the third line pressure Pl3 only when the vehicle runs in the reverse direction with the REVERSE brake 70 placed in the engaged position. In the third pressure regulating valve 220 constructed as described above, the valve spool 222 is moved to a position of equilibrium of forces according to an equation similar to the equation (1), so that the third line pressure Pl3 is controlled to an optimum level based on the SPEED-RATIO and THROTTLE pressures Pe and Pth. The optimum level is a permissible lowest value required to permit the reversing device 16 to transmit received input torque without slipping of the brake 70 or clutch 72.

When the REVERSE brake 70 is placed in the engaged position, the third line pressure Pl3 is applied to the chamber 248, whereby the force biasing the spool 222 toward the open position is increased, to thereby increase the third line pressure Pl3. This arrangement assures optimum torque transmitting capacity of the FORWARD clutch 72 and REVERSE brake 70 during engagement of the clutch 72 or brake 70 to run the vehicle in the forward or reverse direction.

The thus regulated third line pressure Pl3 is applied to the FORWARD clutch 72 or REVERSE brake 70 by means of a shift lever valve 250. This shift lever valve 250 has a valve spool 254 which is moved in response to an operation of the shift lever 252, which has six operating positions, i.e., NEUTRAL "N", PARKING "P", LOW "L", SECOND "S", DRIVE "D" and REVERSE "R". The shift lever valve 250 has an output port 256 and an output port 258. When the shift lever 252 is placed in the NEUTRAL position "N", the third line pressure Pl3 is not supplied from the output ports 256, 258. When the shift lever 252 is placed in one of the LOW, SECOND and DRIVE positions "L", "S" and "D", the third line pressure Pl3 is supplied primarily through the output port 258 to the FORWARD clutch 72, a chamber 450 of the first line pressure reducing control valve 440 (referred to above) and a chamber 432 of a REVERSE INHIBIT valve 420, while at the same time the fluid is discharged from the brake 70. When the shift lever 252 is placed in the REVERSE position "R", the third line pressure Pl3 is supplied through the output port 256 to the third pressure regulating valve 220, lock-up clutch control valve 320, a chamber 452 of the first line pressure reducing control valve 440 and a port 422a of the REVERSE INHIBIT valve 420, so that the pressure Pl3 is applied to the REVERSE brake 70 through the REVERSE INHIBIT valve 420, while at the same time the fluid is discharged from the FORWARD clutch 72. When the shift lever 252 is placed in the PARKING position "P", the fluid is discharged from the brake 70 and clutch 72 at the same time. As indicated in FIG. 2, the spool 254 of the shift lever valve 250 has six operating positions "L", "S", "D", "N", "R" and "P" corresponding to those of the shift lever 252.

Accumulators 340 and 342 are connected to the brake 70 and clutch 72, respectively, for the purpose of slowly raising the pressure applied to the brake and clutch 70, 72, so that the frictionally coupling devices of the brake and clutch may be smoothly engaged. A shift timing valve 210 connected to the clutch 72 functions to prevent a transient excessively high rate of flow of the fluid to the clutch 72, such that a flow restrictor 212 is closed with a rise in the pressure in the cylinder of the clutch 72.

The first and second line pressures Pl1 and Pl2 adjusted by the first and second pressure regulating valves 100, 102, respectively, are applied to the one and the other of the first and second hydraulic cylinders 54, 56 of the CVT 14 through a shift control valve assembly 260, for controlling the speed ratio "e" of the CVT 14. The shift control valve assembly 260 has a directional control valve 262 and a flow control valve 264. These control valves 262, 264 receive through a fourth pressure line 370 a fourth line pressure Pl4 which is produced by a fourth pressure regulating valve 170 based on the first line pressure P(1. The directional control valve 262 serves to change the direction in which the speed ratio "e" of the CVT 14 is changed, while the flow control valve 264 serves to change the rate in which the speed ratio "e" is changed.

Figure 9:
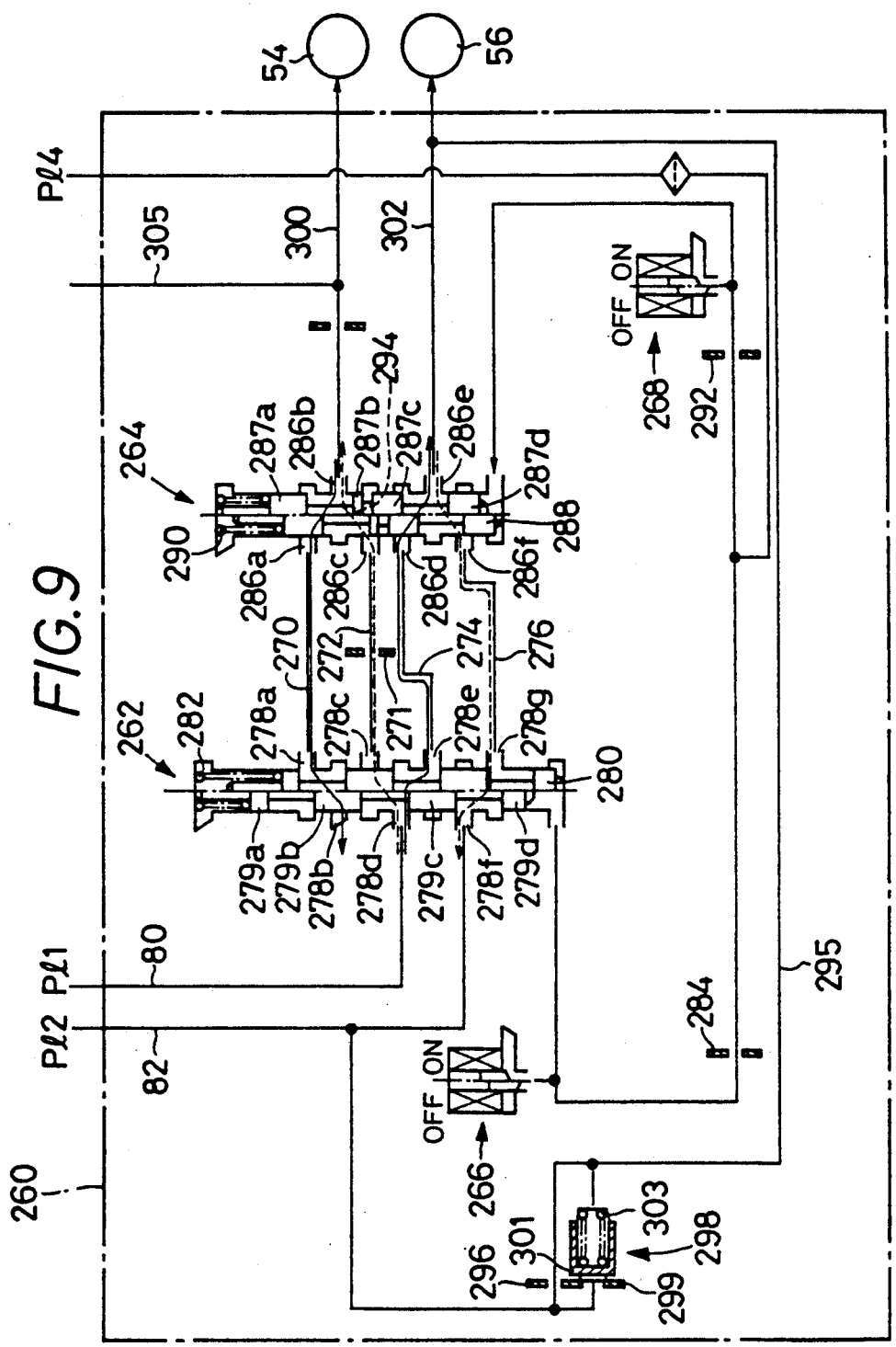
FIG. 9 is a view illustrating in detail a shift control valve assembly of the apparatus of FIG. 2.

Referring to FIG. 9 which shows the details of the shift control valve assembly 260, the directional control valve 262 is a spool valve controlled by a first solenoid-operated valve 266 which has a first solenoid coil 265. The valve 262 has ports 278a, 278c, 278e and 278g which communicate with respective first, second, third and fourth connecting lines 270, 272, 274 and 276 that are connected to the flow control valve 264. The line 272 is provided with a flow restrictor 271. The directional control valve 262 further has a drain port 278b communicating with the drain of the hydraulic system, a port 278d communicating with the first pressure line 80 to receive the first line pressure Pl1, and a port 278f communicating with the second pressure line 82 to receive the second line pressure Pl2. The valve 262 includes a valve spool 280 which is axially slidably movable between a first position corresponding to one end (upper end as viewed in FIG. 9) of an operating stroke thereof, and a second position corresponding to the other end (lower end as viewed in FIG. 9) of the operating stroke. The spool 280 is biased by a spring 282 toward its second position.

The valve spool 280 has four lands 279a, 279b, 279c and 279d which open and close the above-indicated ports of the valve 262. The upper end of the spool 280 on the side of the spring 282 is exposed to the atmospheric pressure, with no hydraulic pressure applied thereto. On the other hand, the lower end of the spool 280 is exposed to the fourth line pressure P(4 when the first solenoid-operated valve 266 is placed in the OFF or closed position. With the valve 266 placed in the ON or open position, however, the fourth line pressure Pl4 is released through the valve 266 located downstream of a flow restrictor 284, whereby the fourth line pressure Pl4 is not applied to the lower end of the valve spool 280. In this arrangement, while the first solenoid-operated valve 266 is ON, the spool 280 is placed in its second position. In this state, the ports 278a and 278b are connected to each other and the ports 278d and 278e are connected to each other, while the ports 278d and 278c are disconnected from each other and the ports 278f and 278g are disconnected from each other. While the solenoid-operated valve 266 is OFF, the spool 280 is placed in the first position, whereby the ports 278a and 278b are disconnected and the ports 278d and 278e are disconnected, while the ports 278d and 278c are connected and the ports 278f and 278g are connected.

The flow control valve 264 of the shift control valve assembly 260 is a spool valve controlled by a second solenoid-operated valve 268 which has a second solenoid coil 267. The valve 264 has ports 286a, 286c, 286d and 286f which communicate with the above-indicated first, second, third and fourth connecting lines 270, 272, 274 and 276. The flow control valve 264 further has a port 286b communicating with the first hydraulic cylinder 54, and a port 286e communicating with the second hydraulic cylinder 56. The valve 264 includes a valve spool 288 which is axially slidably movable between a first position on the side of one end (upper end as viewed in FIG. 9) of an operating stroke thereof, and a second position on the side of the other end (lower end as viewed in FIG. 9) of the operating stroke. The spool 288 is biased by a spring 290 toward its second position.

The valve spool 288 has four lands 287a, 287b, 287c and 287d which open and close the above-indicated ports of the valve 264. However, the intermediate two lands 278b and 278c are functionally considered to be a single land, which is divided into two portions that provide a flow restrictor 294. In the present embodiment, therefore, the spool 288 has three lands (287a, 287b-287c and 287d). As in the valve 262, the upper end of the spool 288 on the side of the spring 290 is exposed to the atmospheric pressure, with no hydraulic pressure applied thereto. On the other hand, the lower end of the spool 288 is exposed to the fourth line pressure Pl4 when the second solenoid-operated valve 268 is placed in the OFF or closed position. With the valve 268 placed in the ON or open position, however, the fourth line pressure Pl4 is released through the valve 268 located downstream of a flow restrictor 292, whereby the fourth line pressure Pl4 is not applied to the lower end of the valve spool 288. In this arrangement, while the second solenoid-operated valve 268 is ON (with the duty cycle set at 100%), the spool 288 is placed in its second position. In this state, the ports 286c and 286b are connected to each other and the ports 286f and 286e are connected to each other, while the ports 286a and 286b are disconnected from each other and the ports 286d and 286e are disconnected from each other. While the solenoid-operated valve 286 is OFF (with the duty cycle set at 0%), the spool 288 is placed in the first position, whereby the ports 286c and 286b are disconnected and the ports 286f and 286e are disconnected, while the ports 286a and 286b are connected and the ports 286d and 286e are connected.

While the second solenoid-operated valve 268 is OFF, the ports 286c and 286b are held in restricted communication with each other through the flow restrictor 294. The second hydraulic cylinder 56 communicates with the second pressure line 82 through a flow restrictor 296 and a check valve 298 which are connected in parallel with each other. These restrictor and check valve 296, 298 are provided to prevent a rapid decrease in the pressure Pout (=Pl1) in the second hydraulic cylinder 56 with the fluid being discharged from the cylinder 56 into the second pressure line 82, when the first line pressure Pl1 is applied to the cylinder 56, during a shift-down operation of the CVT 14 which requires the pressure Pout to be higher than the pressure Pin in the first cylinder 54, or during an engine-braking operation in which torque is transmitted in the direction from the output shaft 38 of the CVT 14 to the input shaft 30.

When the first solenoid-operated valve 266 is turned ON, the pressurized fluid in the first pressure line 80 is fed into the second cylinder 56 through the port 278d, port 278e and third connecting line 274, port 286d, port 286e and a second cylinder line 302, as indicated in solid line in FIG. 9, while the fluid in the first cylinder 54 is discharged to the drain through a first cylinder line 300 and the port 286b, port 286a, first connecting line 270, port 278a and port 278b, as also indicated in solid line in FIG. 9. As a result, the speed ratio "e" of the CVT 14 is reduced so as to reduce the speed of the vehicle, i.e., the CVT 14 is shifted down.

When the first solenoid-operated valve 266 is turned OFF, the pressurized fluid in the first pressure line 80 is fed into the first cylinder 54 through the port 278d, port 278c, second connecting line 272, port 286c, port 286b and first cylinder line 300, as indicated in broken line in FIG. 9, while the fluid in the second cylinder 56 is discharged to the second pressure line 82 through the second cylinder line 302, port 286e, port 286f, fourth connecting line 276, port 278g and port 278f, as also indicated in broken line in FIG. 9. As a result, the speed ratio "e" of the CVT 14 is increased so as to increase the speed of the vehicle, i.e., the CVT 14 is shifted up. A flow restrictor 273 is provided between the port 286b of the flow control valve 264 and a connecting point between the first cylinder line 300 and a branch line 305 leading to the first pressure regulating valve 100.

Figure 10:
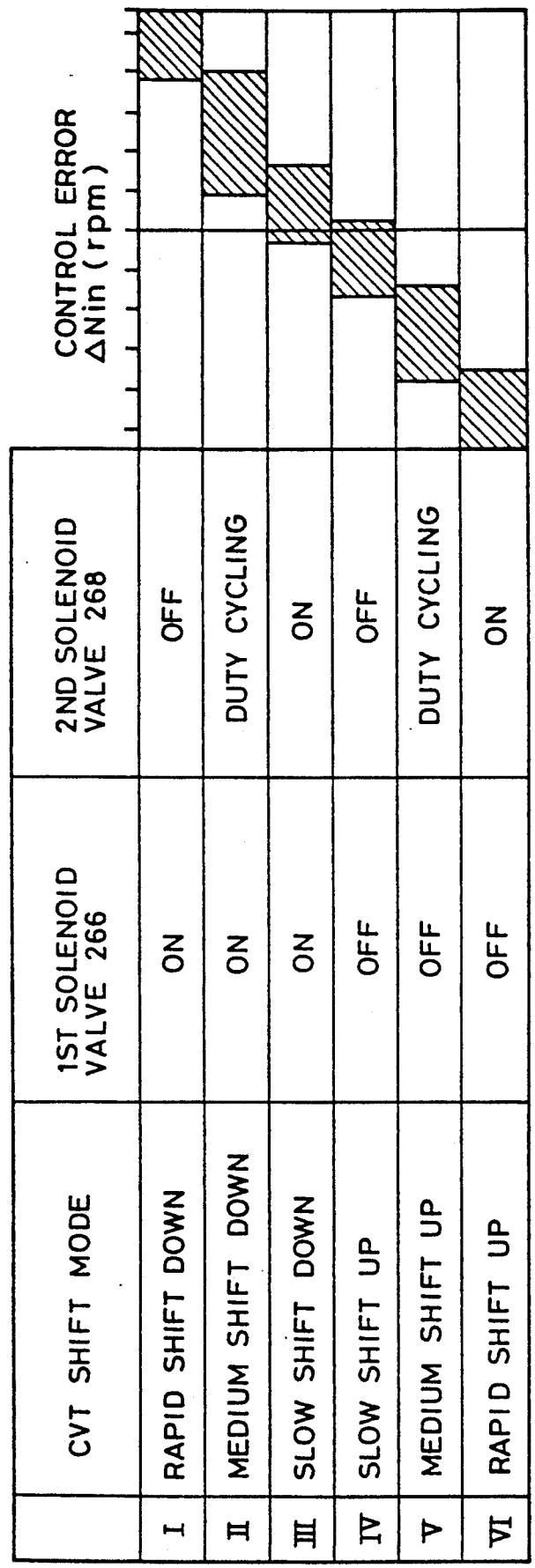
FIG. 10 is a view indicating a relationship between on-off states of a first and a second solenoid valve of the valve assembly of FIG. 9 and different shifting modes of the CVT.

Referring to FIG. 10, there are shown shift modes of the CVT 14 in relation to the operating states (ON and OFF states) of the first and second solenoid-operated valves 266 and 268. The shift modes have different shifting directions and different rates of change in the speed ratio "e". Namely, the shift mode IV is established when both of the first and second solenoid-operated valves 266, 268 are OFF. In this shift mode IV, the pressurized fluid in the first pressure line 80 is fed into the first cylinder 54 through the flow restrictor 294 formed through the valve spool 288 of the flow control valve 264, while the fluid in the second cylinder 56 is discharged at a relatively low rate into the second pressure line 82 through the flow restrictor 296. The shift mode III is established when the first and second solenoid-operated valves 266, 268 are both ON. In this mode III, the fluid in the second pressure line 82 is fed into the second cylinder 56 through the flow restrictor 296 provided in the by-pass line 295, and through the check valve 298. The flow restrictor 296 and check valve 298 are disposed in parallel with each other. At the same time, the fluid in the first cylinder 54 is discharged at a relatively low rate through a small clearance which is purposely or inherently formed or provided between the piston and the mating sliding surface of the cylinder 54.

The by-pass line 295 provided between the second cylinder 56 and the second pressure line 82 as described above effectively prevents or minimizes a phenomenon of pulsation of the pressure Pout in the second cylinder 56 which would occur in synchronization with the duty cycling operation of the flow control valve 264. More specifically, the upper peak of the spike of the pressure Pout is released through the flow restrictor 296, while the lower peak of the pressure Pout is compensated for by the check valve 298. The check valve 298 includes a valve seat 299 having a flat seat surface, a valve member 301 having a flat operating surface which is abutable on the valve seat 299, and a spring 303 for biasing the valve member 301 against the seat 299. This check valve 298 is adapted to be opened when a pressure difference across the valve exceeds about 0.2 kg/cm, This check valve 298 functions as a one-way valve for preventing a flow of the fluid therethrough in the direction from the second hydraulic cylinder 56 toward the second pressure line 82.

Figure 11:
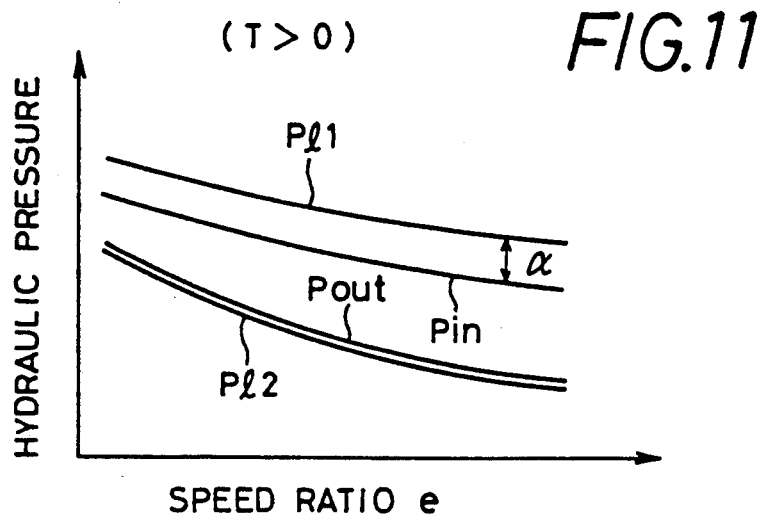
FIGS. 11, 12 and 13 are graphs indicating relationships between the speed ratio of the CVT and hydraulic pressures at different locations of the apparatus of FIG. 2, where the vehicle is running in normal, engine-brake and non-load running conditions, respectively.
Figure 12:
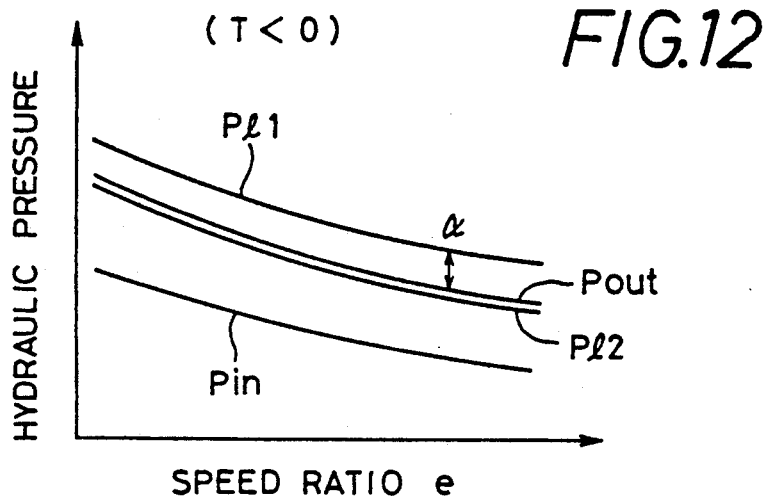
Figure 13:
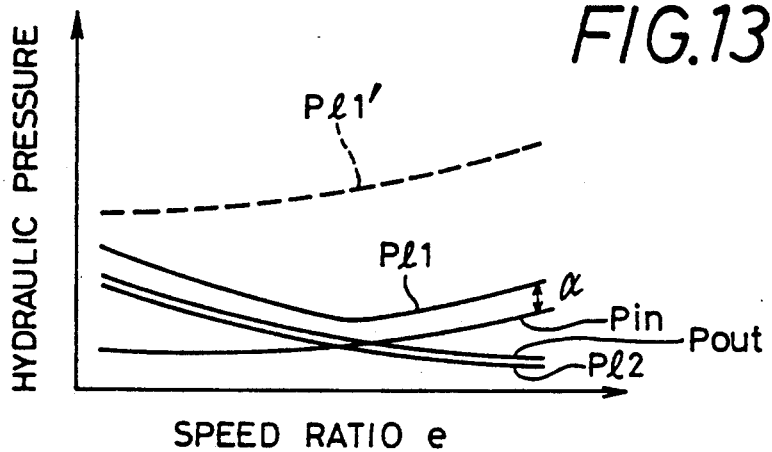

In the CVT 14, it is desirable that the first line pressure Pl1 have an optimum value with respect to the second line pressure Pl2 and the cylinder pressures Pin and Pout, as indicated in FIG. 11 when torque T is transmitted through the CVT 14 in the forward direction from the input shaft 30 toward the output shaft 38 (when the torque T is positive), and as indicated in FIG. 12 when the torque T is transmitted in the reverse direction from the output shaft 30 toward the input shaft 30 as in an engine-brake running of the vehicle (when the torque T is negative). The optimum value of the first line pressure Pl1 as shown in FIGS. 10 and 11 varies with the speed ratio "e" of the CVT 14, with the torque of the input shaft 30 held constant at a given level. In the present embodiment wherein the first and second hydraulic cylinders 54, 56 have the same pressure-receiving area, the pressure Pin in the first cylinder 54 is higher than the pressure Pout in the second cylinder 56 during the positive-torque running of the vehicle, as indicated in FIG. 11. On the other hand, the pressure Pout is higher than the pressure Pin during the negative-torque running (engine-brake running) of the vehicle, as indicated in FIG. 12. That is, the pressure in the driving side cylinder 54, 56 is higher than the pressure in the driven side cylinder 54, 56. In the positive-torque running of FIG. 11, the pressure Pin in the driving side cylinder 54 provides a thrust which determines the speed ratio "e" of the CVT 14. In view of this, the first line pressure Pl1 is desirably adjusted so as to be higher than the pressure Pin by an extra amount $\alpha$ which is a minimum value required to establish the desired speed ratio "e" with a minimum power loss. However, it is impossible to adjust the first line pressure Pl1 based on one of the pressures Pin and Pout of the two cylinders 54, 56. In view of this, the first pressure regulating valve 100 is provided with the second plunger 148, so that the valve spool 140 of the valve 100 receives a biasing force based on a higher one of the pressure Pin and the second line pressure Pl2. According to this arrangement, the first line pressure Pl1 is determined based on the higher one of the pressures Pin and Pl2 whose curves intersect each other as indicated in FIG. 13, i.e., based on the higher pressure Pin or Pl2 while the vehicle is running with no load applied to the CVT 14. More precisely, the optimum first line pressure Pl1 is determined by adding the above-indicated required minimum extra value $\alpha$, so that the first line pressure Pl1 is a minimum level required to obtain the desired speed ratio "e" with a minimum power loss. A curve indicated in broken line in FIG. 13 represents the first line pressure Pl1' where the first pressure regulating valve 100 is not provided with the second plunger 148. This curve indicates that the first line pressure Pl1' is unnecessarily high when the desired speed ratio "e" is relatively high.

Figure 14:
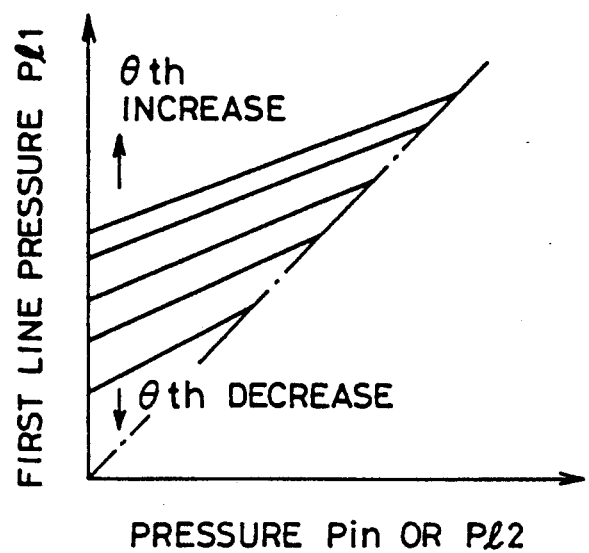
FIG. 14 is a graph indicating an output characteristic of the first pressure regulating valve of FIG. 4, i.e., a relationship between a first line pressure and a second line pressure or a pressure in a first hydraulic cylinder of the CVT.

As indicated above, the extra value $\alpha$ is a minimum value which is required to change the speed ratio "e" of the CVT 14 over its entire range available. It will be understood from the above equation (2) that the first line pressure Pl1 increases in relation to the THROTTLE pressure Pth, since the pressure-receiving areas of the relevant elements of the first pressure regulating valve 100 and the biasing force of the spring 144 are so determined. Although the first line pressure Pl1 adjusted by the first pressure regulating valve 100 increases with the pressure Pin or Pl2 and the THROTTLE pressure Pth, the pressure Pl1 is saturated at a highest value which varies with the THROTTLE pressure Pth ($\theta$th), as indicated in FIG. 14. This arrangement prevents an excessive rise in the first line pressure Pl1 (higher than the pressure Pin in the first cylinder 54 by the extra value $\alpha$), even if the pressure Pin increases while the speed ratio "e" is the highest value with the minimum width of the V-groove of the first pulley 40 (while the movement of the movable rotor 50 is mechanically prevented).

The fluid discharged from the port 150b of the first pressure regulating valve 100 is fed into the lock-up clutch line 92, and directed to a lock-up pressure regulating valve 310 for producing as a LOCK-UP CLUTCH pressure Pcl suitable for operating the lock-up clutch 36 of the fluid coupling 12. The lock-up pressure regulating valve 310 has a valve spool 312 which receives as a feedback pressure the LOCK-UP CLUTCH pressure Pcl. The spool 312 is biased by this feedback pressure Pcl toward its open position. The valve 310 further has a spring 314 for biasing the spool 312 to the closed position, a chamber 316 to which is applied the LOCK-UP CLUTCH pressure Pcl through a rapid release valve 400 (which will be described) upon rapid releasing of the lock-up clutch 36, and a plunger 317 which receives the pressure in the chamber 316 to thereby bias the spool 312 toward the closed position. The valve spool 312 is moved to a position of equilibrium between a thrust based on the feedback pressure Pcl and a biasing force of the spring 314, whereby the LOCK-UP CLUTCH pressure Pcl in the lock-up clutch line 92 is suitably adjusted. When the LOCK-UP CLUTCH pressure Pcl is applied to the chamber 316 upon rapid releasing of the lock-up clutch 36, the pressure Pcl is further raised to further accelerate the releasing of the lock-up clutch 36. The fluid discharged from the lock-up pressure regulating valve 310 is supplied to various portions of the power transmitting system through a flow restrictor 318 and a lubrication line 94, and is returned to the suction line 78 of the oil pump 74.

The thus regulated LOCK-UP CLUTCH pressure Pcl is applied selectively to the engaging and releasing lines 322, 324 of the fluid coupling 12 through a lock-up clutch control valve 320, whereby the lock-up clutch 36 is engaged and disengaged or released. The lock-up clutch control valve 320 has a valve spool 326 for selective connection of the lock-up clutch line 92 with the engaging and releasing lines 322, 324. The spool 326 is biased by a spring 328 toward a releasing position for releasing the lock-up clutch 36. Adjacent to the upper end of the spool 326 (on the side of the spring 328), there is formed a chamber 334 which receives the third line pressure Pl3 supplied from the output port 256 of the shift lever valve 250 through a line 257 only when the shift lever 252 is placed in the REVERSE position "R". With the shift lever 252 placed in the other positions, the chamber 334 is drained. Adjacent to the lower end of the spool 326 remote from the spring 328, there is formed a chamber 332 which receives a pilot pressure Psol3 when a normally open third solenoid-operated valve 330 is placed in the ON or closed position. That is, when the third solenoid-operated valve 330 is ON, the pressure in a portion of the line connected to the chamber 332 which is downstream of a flow restrictor 331 is equal to the LOCK-UP CLUTCH pressure Pcl and is used as the pilot pressure Psol3. However, when the valve 330 is OFF or open, the above-indicated portion of the line connected to the chamber 332 is drained, whereby the chamber 332 is drained. The flow restrictor 331 and the third solenoid-operated valve 330 constitute means for producing the pilot pressure Psol3, which is applied to the chamber 332 of the lock-up clutch control valve 320, and to the second line pressure reducing control valve 380, lock-up clutch rapid release valve 400, and REVERSE INHIBIT valve 420.

While the third solenoid-operated valve 330 is ON with the shift lever 252 placed in one of the positions other than the REVERSE position "R", therefore, the pilot pressure Psol3 is applied to the chamber 332 of the valve 320, while the chamber 334 is exposed to the atmospheric pressure, whereby the spool 326 is moved to its stroke end on the side of the spring 328. Consequently, the fluid in the lock-up clutch line 92 is supplied to the engaging line 322, and the lock-up clutch 36 is engaged. With the valve 330 turned OFF, on the other hand, the chamber 332 is exposed to the atmospheric pressure, and the spool 326 is moved under the biasing action of the spring 328, to the other stroke end (lower end as viewed in FIG. 2). Consequently, the fluid in the line 92 is supplied to the releasing line 324, and the lock-up clutch 36 is released.

When the shift lever 252 is operated to the REVERSE position "R", the third line pressure Pl3 is applied to the chamber 334, whereby the spool 326 is moved to its lower stroke end (as viewed in FIG. 2) to release the lock-up clutch 36, irrespective of the ON-OFF state of the third solenoid-operated valve 330, since a sum of the biasing force of the spring 328 and a force based on the pressure Pl3 exceeds a force based on the pilot pressure Psol3 acting on the spool 326.

The fluid discharged through a flow restrictor 336 upon engagement of the lock-up clutch 36, and the fluid which is returned from the clutch 36 through the engaging line 322 and discharged from the valve 320 upon releasing of the clutch 36, are regulated by a cooler pressure control valve 338 so that the pressure of the discharged fluid is lowered to a suitable level. The fluid whose pressure is thus adjusted by the valve 338 is returned to an oil reservoir (not shown) via an oil cooler 339.

There will next be described the manner in which the back pressures of the accumulators 342, 340 for the FORWARD clutch 72 and REVERSE brake 70 are controlled.

Figure 15:
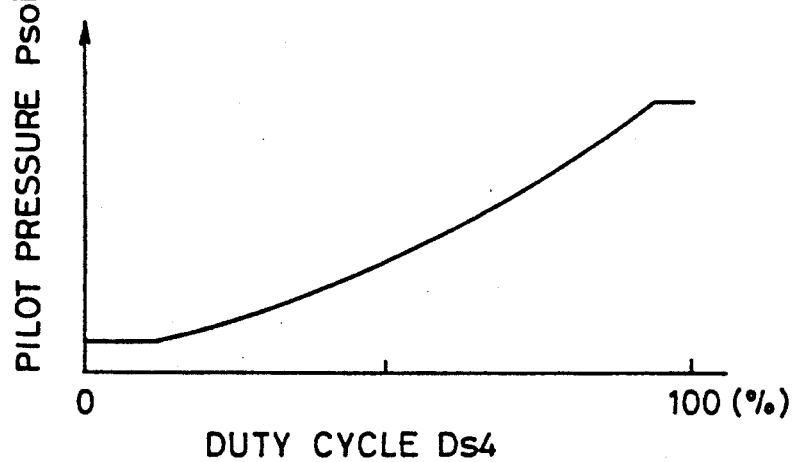
FIG. 15 is a graph indicating a relationship between the duty cycle of a fourth solenoid valve of the apparatus of FIG. 2 and a pilot pressure continuously changed with the duty cycle.
Figure 16:
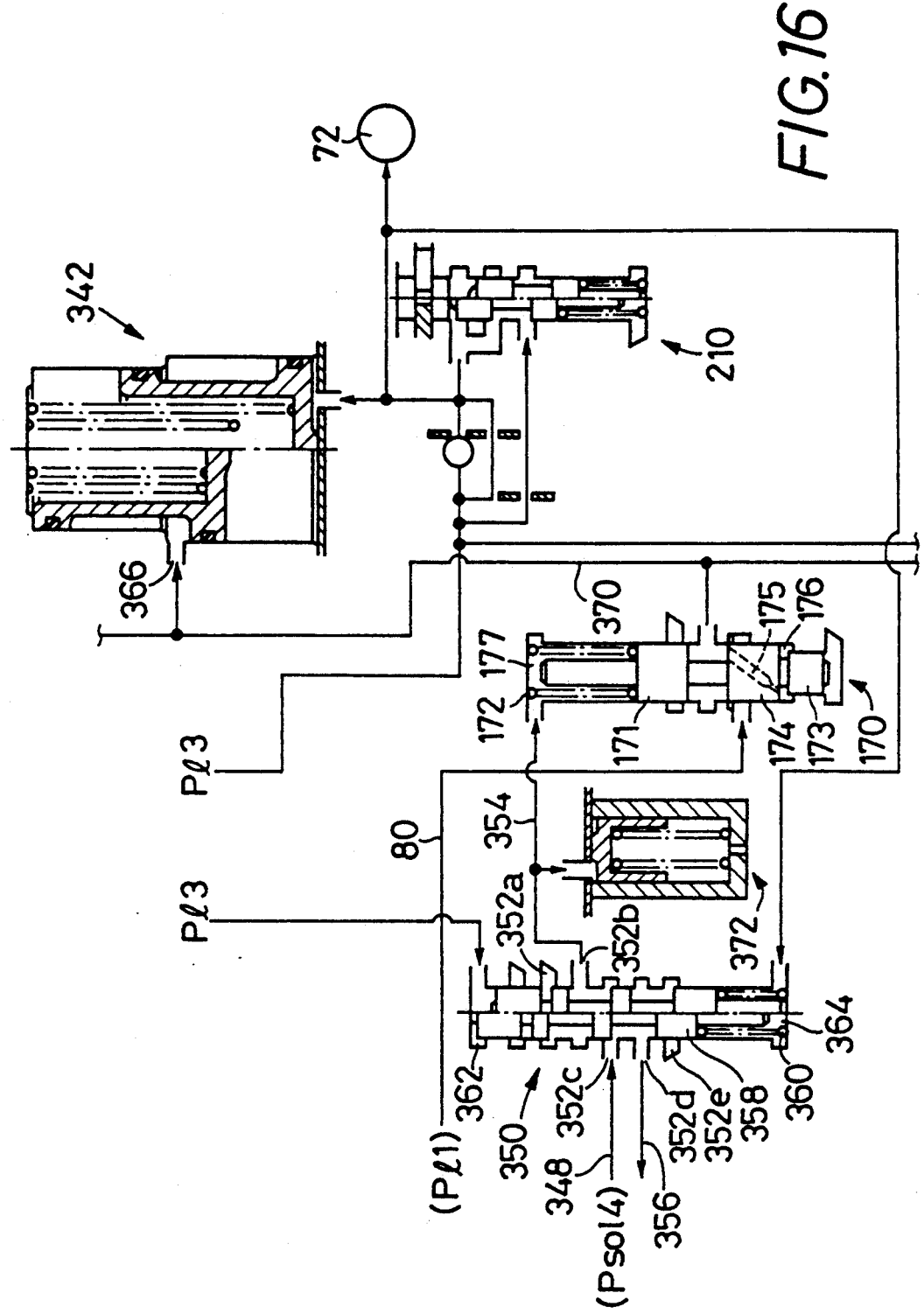
FIG. 16 is a view showing in detail a pilot pressure switch valve and the fourth solenoid valve of the apparatus of FIG. 2.

The lock-up clutch line 92 is connected through a flow restrictor 344 to a normally open fourth solenoid-operated valve 346, so that the pressure downstream of the restrictor 344 is regulated as a pilot pressure Psol4 in relation to the duty cycle Ds4 of the solenoid-operated valve 346, as indicated in FIG. 15. Namely, the restrictor 344 and the fourth solenoid-operated valve 346 constitute means for producing the pilot pressure Psol4. This pilot pressure Psol4 thus adjusted by the controlled duty cycle Ds4 of the solenoid-operated valve 246 is applied to a pilot pressure switch valve 350 through a line 348. As shown in FIG. 16, the switch valve 350 has a drain port 352a, a port 352b communicating with a line 354, a port 352c communicating with the line 348, a port 352d communicating with a line 356, and a drain port 352e. The switch valve 350 further has a valve spool 358 slidably movable between a first position corresponding to one end (upper end as viewed in FIG. 16) of the operating stroke, and a second position corresponding to the other end (lower end as viewed in FIG. 16) of the operating stroke. The spool 358 is biased by a spring 360 toward the first position. Adjacent to the upper end of the spool 358, there is formed a chamber 362 which is always exposed to the third line pressure Pl3. Adjacent to the lower end of the spool 358 (on the side of the spring 360), there is formed a chamber 364 adapted to receive the pressure in the FORWARD clutch 72. When the shift lever 252 is placed in one of the PARKING, REVERSE and NEUTRAL positions "P", "R" and "N", the hydraulic cylinder of the FORWARD clutch 72 is drained by the shift lever valve 250, whereby the chamber 364 is drained. As a result, the valve spool 358 is moved to the second position by the third line pressure Pl3 in the chamber 362, whereby the ports 352c and 352b are connected to each other, while the ports 352d and 352e are connected to each other. Consequently, the pilot pressure Psol4 is applied to a chamber 177 of the fourth pressure regulating valve 170 through the line 354, and the line 356 is drained. When the shift lever 252 is operated from the NEUTRAL position "N" to the DRIVE, SECOND or LOW position "D", "S" or "L", however, the pressure in the cylinder of the FORWARD clutch 72 is initially raised as a function of time under a pressure absorbing action of the accumulator 342, so that the pressure in the clutch 72 reaches the third line pressure Pl3 when the clutch 72 is completely engaged. It will be understood, therefore, that the pilot pressure Psol4 in the line 348 is applied to the fourth pressure regulating valve 170 via the pilot pressure switch valve 350 before the clutch 72 is completely engaged or the pressure in the chamber 364 reaches the third line pressure Pl3. After the clutch 72 is fully engaged (after the pressure in the chamber 364 is elevated up to the level of the third line pressure Pl3), the spool 358 is moved to the first position, whereby the ports 352$b$ and 352$a$ are connected to each other while the ports 352$c$ and 352$d$ are connected to each other. As a result, the line 354 is drained, and the pilot pressure Psol4 in the line 348 is applied to the second line pressure reducing control valve 380 and lock-up clutch rapid release valve 400, through the switch valve 350 and line 356.

The back pressures of the accumulators 340, 342 are controlled in order to limit a rate of rise in the pressures in the cylinders of the clutch 72 and brake 70, for thereby reducing engaging shocks of the clutch 72 and brake 70, when the shift lever 252 is operated from the NEUTRAL position "N" to the DRIVE position "D" or REVERSE position "R". To this end, the fourth pressure regulating valve 170 is adapted to regulate the fourth line pressure Pl4 which is applied through a fourth pressure line 370 to back pressure ports 366 and 368 of the accumulators 342, 340 for the clutch 72 and brake 70. That is, the fourth pressure regulating valve 170 functions to control the pressure absorbing functions of the accumulators 342, 340, so as to minimize the engaging shocks of the clutch 72 and brake 70.

The fourth pressure regulating valve 170 has a valve spool 171 for selective connection and disconnection of the first pressure line 80 to and from the fourth pressure line 370. The spool 171 is biased by a spring 172 toward its open position, and has a first land 173 and a second land 174. Between the lands 173, 174, there is formed a chamber 176 which is adapted to receive as a feedback pressure the fourth line pressure Pl4 through a flow restrictor 175. Adjacent to one end of the spool 171 on the side of the spring 172, there is formed a chamber 177 adapted to receive the pilot pressure Psol4, such that the pressure Psol4 biases the spool 171 toward the open position. The other end of the spool 171 is exposed to the atmospheric pressure. In the thus constructed fourth pressure regulating valve 170, the spool 171 is moved to a position of equilibrium of a valve closing force based on the feedback pressure corresponding to the fourth line pressure Pl4, and a sum of the valve opening biasing force of the spring 172 and a valve opening force based on the pilot pressure Psol4. As a result, the fourth line pressure Pl4 is adjusted in relation to the pilot pressure Psol4.

Figure 17:
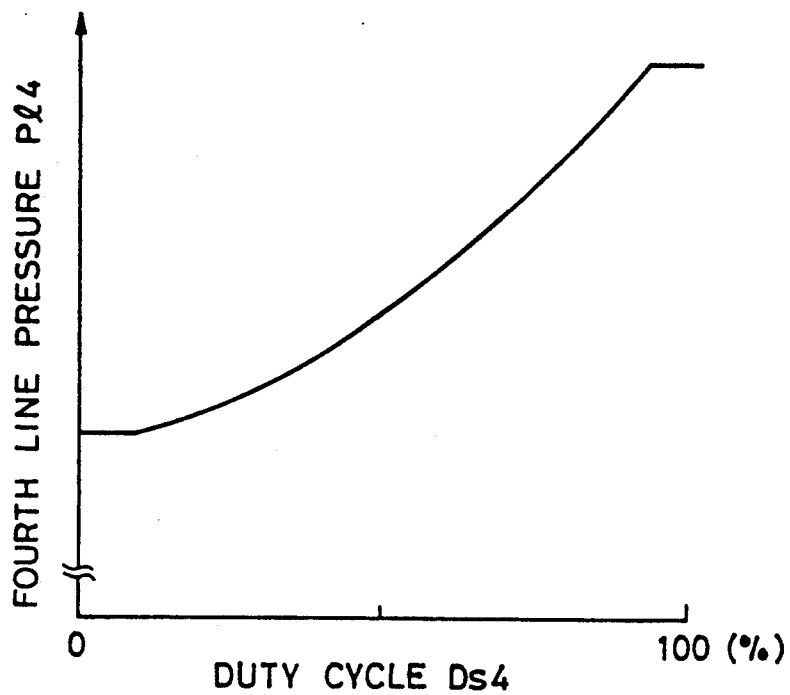
FIG. 17 is a graph indicating a relationship between the duty cycle of the fourth solenoid valve and a fourth line pressure continuously changed with the duty cycle.

Described more specifically, while the pilot pressure Psol4 acts on the fourth pressure regulating valve 170 through the pilot switch valve 350 upon shifting of the shift lever 252 from the position "N" to the position "D" or "R", the fourth line pressure Pl4 is regulated in relation to the duty cycle Ds4 of the fourth solenoid-operated valve 346, as indicated in FIG. 17. In other words, the duty cycle Ds4 of the valve 346 is controlled so as to control the back pressures of the accumulators 342, 340, for minimizing the engaging shocks of the clutch 72 and brake 70. When the pressure in the cylinder of the clutch 72 rises to the third line pressure Pl3, the pilot pressure Psol4 which has been applied to the fourth pressure regulating valve 170 is cut off by the pilot switch valve 350, whereby the chamber 177 is exposed to the atmosphere, and the fourth line pressure Pl4 is regulated to a relatively low level in the neighborhood of 4 kg/cm$^2$, which corresponds to the biasing force of the spring 172 biasing the spool 171 toward the open position. The thus regulated fourth line pressure Pl4 is used primarily for controlling the directional and flow control valves 262, 264 of the shift control valve assembly 260. An accumulator 372 is connected to the line 354, for the purpose of absorbing the pulsation of the pilot pressure Psol4 which would arise in relation to the frequency of the drive pulses to activate the fourth solenoid-operated valve 346 under a controlled duty cycle.

Referring back to FIG. 2, the second line pressure reducing control valve 380 is provided to protect the transmission belt 44 against an overload due to a pressure rise in the driven side hydraulic cylinder 54, 56, which pressure rise is caused by a centrifugal force during rotation of the driven side pulley 40, 42. Described more specifically, when the vehicle is running at a high speed with the output shaft 38 of the CVT 14 rotating at a high speed, the control valve 380 primarily functions to reduce the second line pressure Pl2 applied to the driven side cylinder, for example, the second cylinder 56. The control valve 380 has a port 382$a$ communicating with a line 356, a port 382$b$ communicating with the pressure-reducing chamber 136 of the second pressure regulating valve 102 through a line 384, and a drain port 382$c$. The valve 380 further has a valve spool 386 which is slidably movable between a first position corresponding to one end (upper end as viewed in FIG. 2) of the operating stroke, and a second position corresponding to the other end (lower end as viewed in FIG. 2) of the stroke. This valve spool 386 is biased by a spring 388 toward the second position. When the third solenoid-operated valve 330 is OFF (open), a chamber 390 formed adjacent to the lower end of the spool 386 corresponding to the second position is drained, whereby the spool 386 is moved to the second position. As a result, the ports 382$b$ and 382$c$ are connected to each other, and the chamber 136 of the second pressure regulating valve is drained, whereby the second line pressure Pl2 is regulated according to the equation (1) indicated above.

When the third solenoid-operated valve 330 is turned ON (closed), on the other hand, the pilot pressure Psol3 (LOCK-UP CLUTCH pressure Pcl) is applied to the chamber 390 of the control valve 380, and the spool 386 is moved to the first position. As a result, the ports 382$a$ and 382$b$ are connected to each other. If the fourth solenoid-operated valve 346 is ON (closed) and the FORWARD clutch 72 is engaged at this time, the LOCK-UP CLUTCH pressure Pcl is applied to the chamber 136 of the second pressure regulating valve 102 through the line 356, ports 382$a$, 382$b$, and line 384. Since this LOCK-UP CLUTCH pressure Pcl biases the spool 110 of the valve 102 toward the closed position, the second line pressure Pl2 is regulated according to the following equation (3):

$$P l2 = [A4 \cdot Pth + W - A1 \cdot Pe - (A2 - A1) \cdot Pcl]/(A3 - A2) \quad (3)$$

Figure 18:
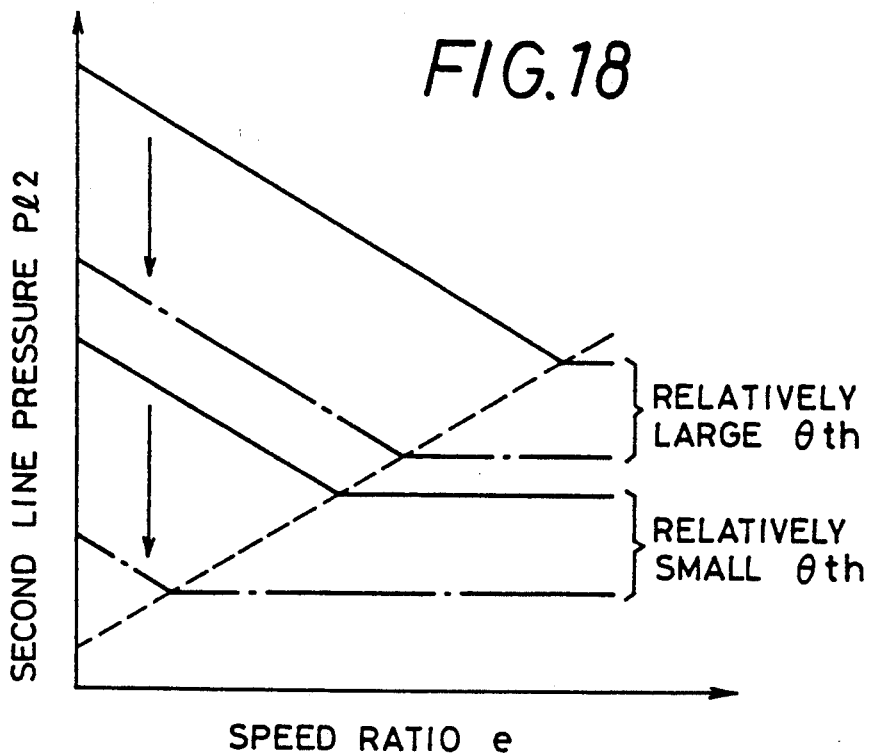
FIG. 18 is a graph indicating the second line pressure which varies with the running speed of the vehicle.

The second line pressure Pl2 as regulated according to the above equation (3) as indicated in one-dot chain lines in FIG. 18 is lowered with respect to the normally regulated second line pressure as indicated in solid lines. Namely, when the vehicle running speed exceeds a predetermined upper limit, the third and fourth solenoid-operated valves 330 and 346 are both turned ON (closed) to lower the second line pressure Pl2. Thus, the second line pressure reducing control valve 380 eliminates or minimizes an adverse effect of an excessive rise in the pressure in the second cylinder 56 (driven side cylinder) due to the centrifugal force when the vehicle speed is relatively high. In other words, the control valve 380 prevents an excessive increase in the tension of the transmission belt 44 even when the driven side shaft (output shaft 38) of the CVT 14 is rotated at a relatively high speed.

It is noted that even when the third solenoid-operated valve 330 is ON (energized), the second line pressure Pl2 is normally regulated according to the equation (1), rather than the equation (3), if the fourth solenoid-operated valve 346 remains OFF.

There will next be described the lock-up clutch rapid release valve 400 provided to improve the releasing response of the lock-up clutch 36 of the fluid coupling 12.

The rapid release valve 400 has a port 402a communicating with the lock-up clutch line 92, a port 402b communicating with the chamber 316 formed adjacent to the end face of the plunger 317 of the lock-up pressure regulating valve 310, a drain port 402c, a port 402d communicating with the engaging line 322 leading to the lock-up clutch 36, a valve spool 406 slidably movable between a first position corresponding to one end (upper end) of the operating stroke and a second position corresponding to the other end (lower end) of the operating stroke, and a spring 408 biasing the spool 406 toward the second position. Adjacent to the lower end of the spool 406, there is formed a chamber 410 adapted to receive the LOCK-UP CLUTCH pressure Pcl when the fourth solenoid-operated valve 346 is ON with the FORWARD clutch 72 being engaged. When the valve 346 is OFF, the chamber 410 is drained. Adjacent to the upper end of the spool 406 on the side of the spring 408, there is formed a chamber 412 adapted to receive the pilot pressure Psol3 (LOCK-UP CLUTCH pressure Pcl) when the third solenoid-operated valve 330 is ON. The chamber 412 is drained when the valve 330 is OFF.

The lock-up clutch rapid release valve 400 is controlled by the third and fourth solenoid-operated valves 330, 346, such that the valve spool 406 is moved to the first position only when the third solenoid-operated valve 330 is OFF while the fourth solenoid-operated valve 346 is ON. In the first position, the LOCK-UP CLUTCH pressure Pcl is applied to the chamber 316 of the lock-up pressure regulating valve 310 through the ports 402a, 402b and line 404, whereby the LOCK-UP CLUTCH pressure Pcl is increased while the fluid discharged from the engaging chamber 33 of the fluid coupling 12 through the engaging line 322 is fed to the drain through the ports 402d and 402c. As a result, the lock-up clutch 36 is rapidly released or disengaged.

When the third and fourth solenoid-operated valves 330, 346 are placed in the other combination of operating states, the spool 406 of the rapid release valve 400 is placed in the second position. In this position, not only the valve 400 functions to reduce the resistance to flow of the fluid out of the engaging chamber 33 of the fluid coupling 12, but also the lock-up pressure regulating valve 310 functions to increase the LOCK-UP CLUTCH pressure Pcl applied to the releasing chamber 35 of the fluid coupling 12. This arrangement therefore permits a rapid releasing operation of the lock-up clutch 36 when the third solenoid-operated valve 330 is turned OFF and the fourth solenoid-operated valve 346 is turned ON. In the present embodiment, the engaging chamber 33 of the fluid coupling 12 is normally drained through a discharge passage which includes the engaging line 322, the lock-up clutch control valve 320 and the cooler 339. Upon rapid releasing of the lock-up clutch 36, however, the engaging chamber 33 is drained through the engaging line 322, and the ports 402d, 402c of the lock-up clutch rapid release valve 400.

The REVERSE INHIBIT valve 420 is provided to inhibit the reversing device 16 from being placed in the reverse position with the REVERSE brake 70 engaged, when the vehicle is running in the forward direction. This valve 420 has a port 422a adapted to receive the third line pressure Pl3 from the output port 256 of the shift lever valve 250 when the valve 250 is placed in the REVERSE position "R". The REVERSE INHIBIT valve 420 further has a port 422b communicating with the cylinder of the REVERSE brake 70 through a line 423, and a drain port 422c. The valve 420 includes a valve spool 424 slidably movable between a first position corresponding to one end (upper end) of the operating stroke and a second position corresponding to the other end (lower end) of the operating stroke. The spool 424 is biased by a spring 426 toward the first position. Adjacent to the upper end of the spool 424, there is formed a chamber 428 adapted to receive the pilot pressure Psol3 (LOCK-UP CLUTCH pressure Pcl) through the line 430 when the third solenoid-operated valve 330 is ON. When the valve 330 is OFF, the chamber 428 is drained. Adjacent to the lower end of the spool 424 (on the side of the spring 426), there is formed a chamber 432 adapted to receive the third line pressure Pl3 from the output port 258 of the shift lever valve 250 when the valve 250 is placed in the DRIVE, SECOND or LOW position "D", "S", "L".

In the REVERSE INHIBIT valve 420, the valve spool 424 is moved to the second position when the third line pressure Pl3 in the chamber 432 is released and the pilot pressure Psol3 (LOCK-UP CLUTCH pressure Pcl) is applied to the chamber 428. In this second position, the ports 422a and 422b are disconnected from each other, to thereby cut off the fluid supply to the REVERSE brake 70, while the ports 422c and 422b are connected to each other, to thereby cause the cylinder of the brake 70 to be drained. As a result, the REVERSE brake 70 is inhibited from being engaged. Namely, the REVERSE INHIBIT valve 420 prevents the reversing device 16 from being placed in the reverse position, even when the shift lever 252 is erroneously moved from the DRIVE position "D" to the REVERSE position "R" past the NEUTRAL position "N" while the vehicle is running in the forward direction. In this event, an electronic control device 460 (which will be described by reference to FIG. 1) commands the third solenoid-operated valve 330 to be turned ON, to thereby cause the reversing device 16 to be placed in the neutral position.

The first line pressure reducing control valve 440 is provided to lower the first line pressure Pl1 by a suitable amount to thereby reduce the operating noise of the belt 44, when the shift lever valve 250 (shift lever 252) is placed in the NEUTRAL or PARKING position "N" or "P". This control valve 440 has a drain port 442a, a port 442b communicating with the chamber 160 between the first and second lands 152, 154 of the first pressure regulating valve 100 through the line 161, a port 442c communicating with the second pressure line 82, a plunger 444, and a valve spool 446 for selective connection and disconnection of the second pressure line 82 to and from the chamber 160 of the valve 100. The spool 446 is biased by a spring 448 toward its open position. Adjacent to the lower end face of the plunger 444, there is formed a chamber 450 which communicates with the output port 258 of the shift lever valve 250 from which the third line pressure Pl3 is applied when the shift lever valve 250 is placed in the DRIVE, SECOND or LOW position "D", "S", "L". Between the plunger 444 and the spool 446, there is formed a chamber 452 which communicates with the output port 256 of the valve 250 from which the third line pressure Pl3 is applied when the valve 250 is placed in the REVERSE position "R".

When the shift lever valve 250 is placed in one of the positions "D", "S", "L" and "R", the spool 446 of the control valve 440 is located at the upper stroke end, whereby the chamber 160 of the first pressure regulating valve 100 is exposed to the atmosphere through the drain port 442a. As a result, the first line pressure Pl1 is normally regulated according to the equation (2) indicated above. When the shift lever valve 250 is operated to the NEUTRAL or PARKING position "N", "P", on the other hand, the spool 446 is moved to its lower stroke end, and the second line pressure Pl2 is applied to the chamber 160 of the first pressure regulating valve 100. As a result, the spool 140 of the valve 100 is biased toward the open position by the second line pressure Pl2 in the chamber 160, whereby the first line pressure Pl1 is lowered. Thus, the tension of the belt 44 is minimized to the extent that prevents the belt 44 from slipping on the pulleys 40, 42. Accordingly, the operating noise of the belt 44 is reduced, and the durability of the belt is improved.

Referring back to FIG. 1, there is indicated the above-indicated electronic control device 460, which serves as control means for controlling the first, second, third and fourth solenoid-operated valves 266, 268, 330, 346 incorporated in the hydraulic circuit shown in FIG. 2, for controlling the speed ratio "e" of the CVT 14, the lock-up clutch 36 of the fluid coupling 12, and the other elements of the power transmitting system of the vehicle. The electronic control device 460 includes a so-called microcomputer which incorporates a central processing unit (CPU), a random-access memory and a read-only memory, as well known in the art The control device 460 receives various signals from various sensors, such as: a VEHICLE speed sensor 462 disposed to detect the rotating speed of the drive wheels 24, and generating a vehicle speed signal representative of the detected speed, i.e., a running speed V of the vehicle; an INPUT SHAFT speed sensor 464 disposed to detect the rotating speed of the input shaft 30 of the CVT 14, and generating an input shaft speed signal representative of the detected speed Nin of the input shaft 30; an OUTPUT SHAFT speed sensor 466 disposed to detect the speed of the output shaft 38 of the CVT 14, and generating an output shaft speed signal representative of the detected speed Nout of the output shaft 38; a THROTTLE sensor 468 disposed to detect an angle of opening of the throttle valve disposed in a suction pipe of the engine 10, and generating a throttle signal representative of the opening angle $\theta$th of the throttle valve; a SHIFT LEVER sensor 470 disposed to detect the currently selected operating position of the shift lever 252, and generating a signal representative of the currently selected position Ps of the shift lever 252; and a BRAKE switch 472 disposed to detect an operation of a brake pedal of the vehicle, and generating a signal indicative of the operation of the brake pedal. The CPU of the electronic control device 460 processes these input signals according to control programs stored in the ROM, while utilizing a temporary data storage function of the RAM, and applies appropriate drive or control signals to the first, second, third and fourth solenoid-operated valves 266, 268, 330 and 346.

Upon application of power to the control device 460, a main control routine is executed after the initialization of the device. In the main control routine, the speeds Nin and Nout of the input and output shafts 30, 38, speed ratio "e" of the CVT 14, the vehicle running speed V and other running parameters of the vehicle are calculated based on the input signals received from the various sensors indicated above. Further, the lock-up clutch 36 and the CVT 14 are suitably controlled, in a controlled sequence or as needed, based on the received input signals.

Figure 19:
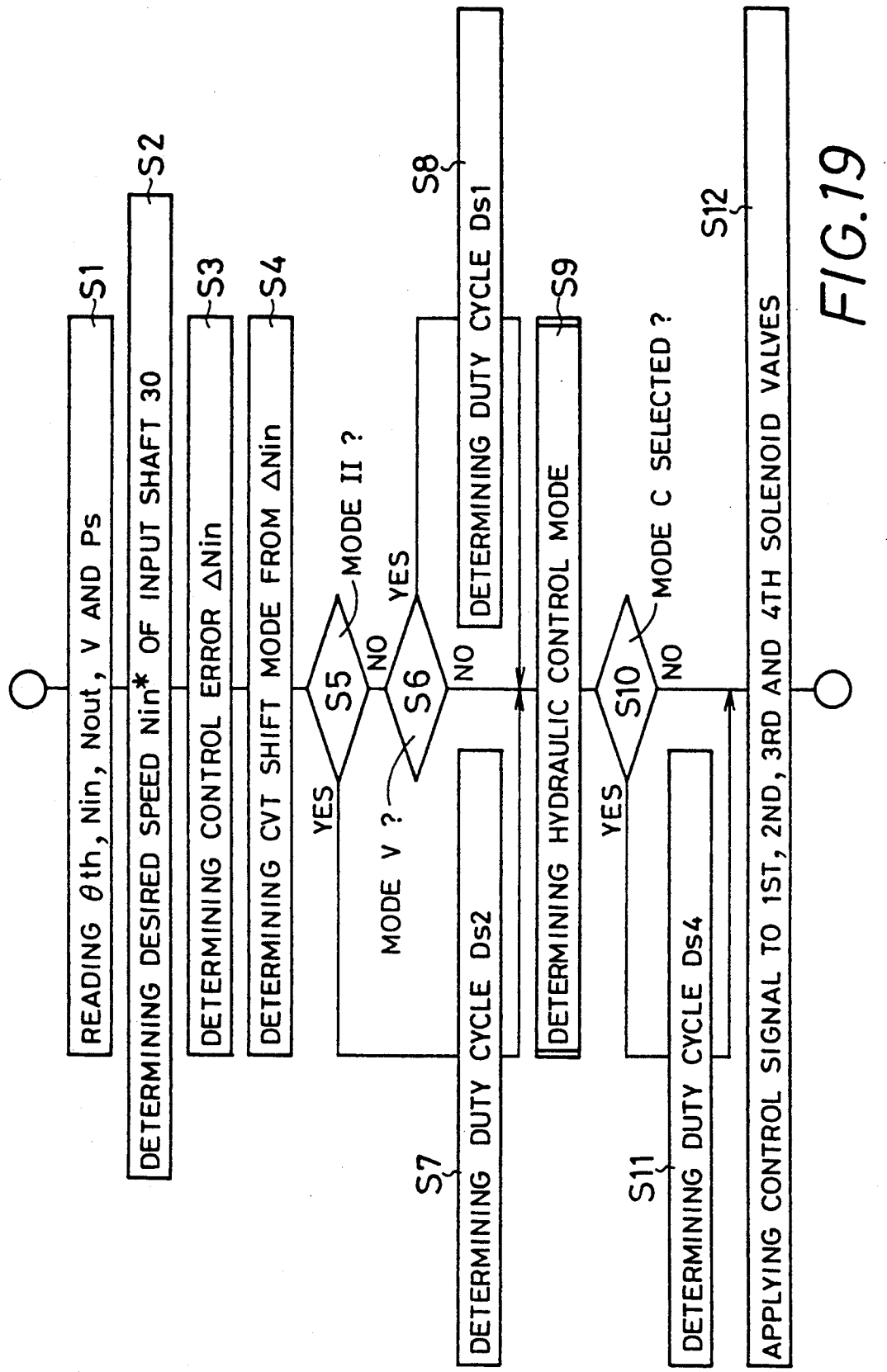
FIG. 19 is a flow chart illustrating an operation of the hydraulic control apparatus of FIG. 2.

The shifting operations of the CVT 14 are controlled, for example, according to a control program as illustrated in the flow chart of FIG. 19.

Initially, step S1 is executed to read in the various input signals from the various sensors, and to calculate the vehicle running speed V, speeds Nin and Nout of the input and output shafts 30, 38, throttle opening angle $\theta$th, and currently selected position Ps of the shift lever 252, based on the received input signals. Then, the control flow goes to step S2 in which a desired or target speed Nin* of the input shaft 30 is determined based on the shift lever position Ps, throttle opening angle $\theta$th and vehicle running speed V, more precisely, according to a predetermined relationship represented by a functional equation Nin* = f($\theta$th, V, Ps) or by the corresponding data map. This relationship, which is stored in the ROM of the control device 460, is determined for each of the DRIVE, SECOND and LOW positions "D", "S" and "L" of the shift lever 252, so that the relevant relationship provides a currently required output of the engine 10 represented by the throttle opening angle $\theta$th, with a minimum fuel consumption by the engine. When the shift lever 252 is placed in the SECOND or LOW position "S", "L", it is generally required or desirable that the vehicle runs in a sporty manner with high drivability, and with a relatively high effect of engine-braking. In view of this requirement, the relationship used for the SECOND or LOW position is determined so that the desired input shaft speed Nin* is higher than that for the DRIVE position, or so that the speed ratio "e" is comparatively low. While the present power transmitting system (shift lever 250 and shift lever valve 250) has the three forward drive positions, DRIVE (D), SECOND (S) and LOW (L), the forward drive positions may be determined otherwise. For example, three or more forward drive positions may be provided in addition to the DRIVE position.

In the following step S3, the CPU of the control device 460 determines a control error ΔNin (=Nin*—Nin) which is a difference between the speed Nin of the input shaft 30 actually detected by the sensor 464 and the determined desired speed Nin*. Step S3 is followed by step S4 to determine or select one of six shift modes I, II, III, IV, V and VI as indicated in the table of FIG. 10, based on the determined control error ΔNin, more specifically, depending upon one of six ranges of the control error amount ΔNin as indicated by hatched areas in the right-hand side portion of FIG. 10. The adjacent ranges of the error amount ΔNin overlap each other at their end portions, so as to avoid control instability when the corresponding adjacent shift modes (as indicated in FIG. 10) are repeatedly alternately selected under some conditions. If the currently detected control error ΔNin falls within the overlapping area of the two adjacent ranges, the currently selected shift mode remains to be selected. For example, if the detected control error ΔNin is reduced from 250 rpm (within the range corresponding to the shift mode II) to 140 rpm within the overlapping area between the ranges corresponding to the shift modes II and III while the shift mode II is selected, the currently selected shift mode is continuously selected. If the control error ΔNin is changed to a value falling within the overlapping area between the ranges corresponding to the shift modes II and III while the shift mode III is selected, the shift mode III is continuously used.

After the shift mode is selected or determined, step S5 is executed to determine whether the shift mode II is currently selected or not, and then step S6 is executed to determine whether the shift mode V is currently selected or not. If the shift mode II has been selected in step S4, an affirmative decision (YES) is obtained in step S5, and the control flow goes to step S7 in which the duty cycle Ds2 of the second solenoid-operated valve 268 is calculated according to the following equation (4). If the shift mode V has been selected in step S4, an affirmative decision (YES) is obtained in step S6, and the control flow goes to step S8 in which the duty cycle Ds2 of the valve 268 is determined according to the following equation (5):

$$Ds2 = 100\% - K1 \cdot \Delta Nin \quad (4)$$

$$Ds2 = -K2 \cdot \Delta Nin \quad (5)$$

where, K1, K2: Constants

These two different equations (4) and (5) are used for determining the duty cycle Ds2, since the flow characteristic of the flow control valve 264 with respect to the duty cycle Ds2 differs between the shift modes II and V. The graph of FIG. 20 indicates the flow characteristic of the valve 264 when the shift mode II (MEDIUM SHIFT DOWN mode) is selected with the first solenoid-operated valve 266 placed in the ON position, while the graph of FIG. 21 indicates the flow characteristic when the shift mode V (MEDIUM SHIFT UP mode) is selected with the valve 266 placed in the OFF position. The flow rate Q shown in these graphs of FIGS. 20 and 21 is that of the fluid flowing through a passage connecting the two output ports 286b and 286e of the flow control valve 266 when the fluid pressure is held constant.

Figure 20:
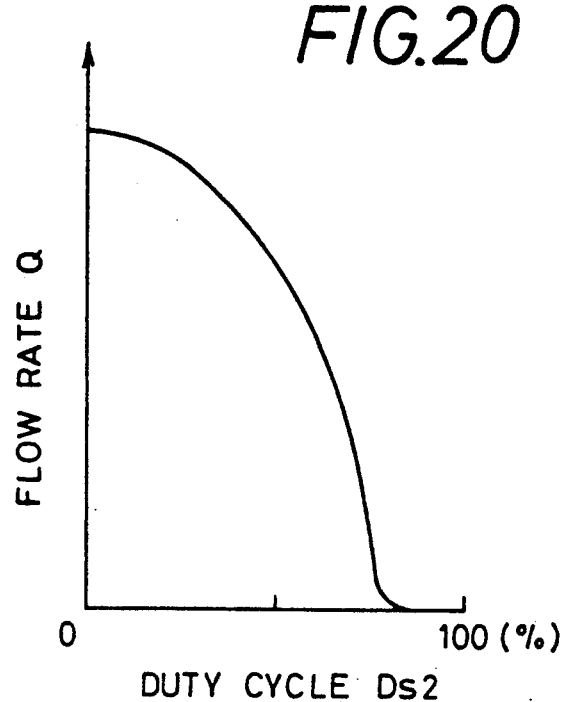
FIGS. 20 and 21 are graphs indicating relationships between the duty cycle of the second solenoid valve, and the flow rate of the flow control valve of the shift control valve assembly, which varies with the duty cycle, where the CVT speed ratio changes to reduce and increase the vehicle speed, respectively.
Figure 21:
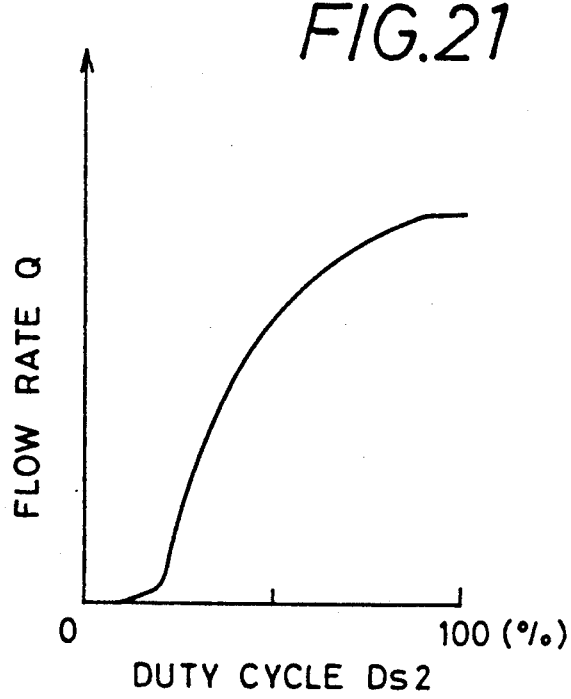

Thus, when the second solenoid-operated valve 268 is turned ON while the first solenoid-operated valve 266 is ON, the flow control valve 264 is fully closed, whereby the flow rate Q is reduced with an increase in the duty cycle Ds2, as indicated in FIG. 20. When the valve 268 is turned ON while the valve 266 is OFF, the flow control valve 264 is fully opened, whereby the flow rate Q is increased with the duty cycle Ds2, as indicated in FIG. 21.

The first and second solenoid-operated valves 266 and 268 ar operated in step S12 (which will be described in detail), according to the ON-OFF states determined by the shift mode selected in step S4, and according to the duty cycle Ds2 determined in step S7 or S8 (for the second solenoid-operated valve 268 only). The duty cycling operation of the second solenoid-operated valve 268 in the shift modes II and V is effected by alternately turning on and off the solenoid coils in a predetermined cycle time Td, with an ON time Td·Ds2/100 and an OFF time Td·(1−Ds2/100). The duty cycle Ds2 of the valve 268 determined according to the equation (4) or (5) causes the flow rate Q of the flow control valve 264 to increase as a function of the amount of control error ΔNin, so that the flow rate Q is controlled so as to reduce the amount of control error ΔNin. Consequently, the actually detected speed Nin eventually coincides with the determined desired or target speed Nin* by controlling the flow control valve 264 in step S12, with the second solenoid-operated valve 268 operated with the duty cycle Ds2 determined in step S7 or S8. Thus, the feedback control of the flow control valve 264 for controlling the speed ratio "e" of the CVT 14 is effected.

Figure 22:
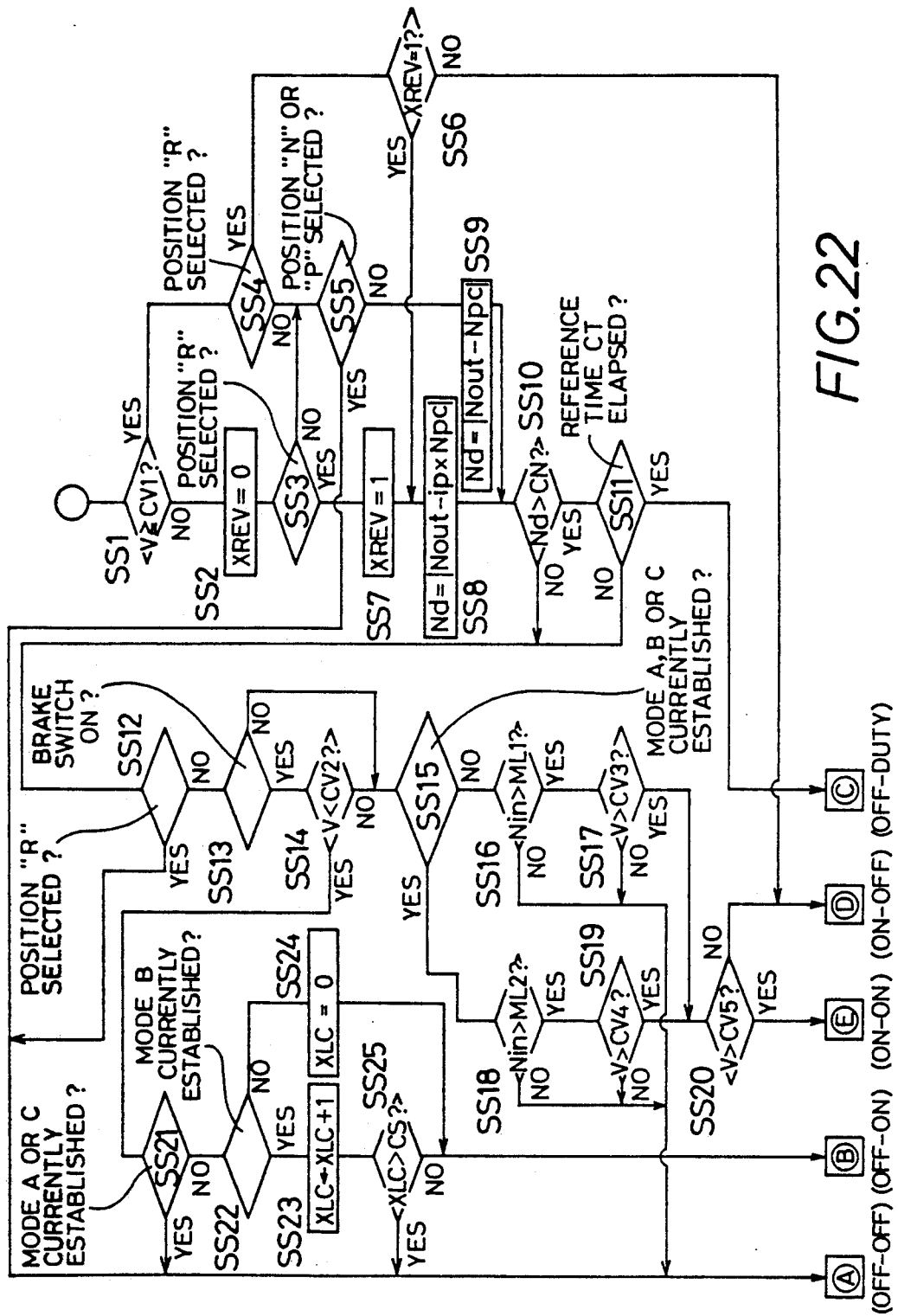
FIG. 22 is a flow chart illustrating a control routine executed in step S9 of the flow chart of FIG. 19.

Steps S7, S6 and S8 are followed by step S9 to determine or select one of five hydraulic control modes A, B, C, D and E which are established by the third and fourth solenoid-operated valves 330 and 346, as indicated in the table of FIG. 23, that is, LOCK-UP CLUTCH RELEASE mode A, LOCK-UP CLUTCH RAPID RELEASE mode B, ACCUMULATOR BACK PRESSURE CONTROL mode C, REVERSE INHIBIT mode D and 2ND LINE PRESSURE REDUCTION mode E. This mode determining routine is effected as indicated in the flow chart of FIG. 22, for example. In FIG. 22, steps SS1 through SS7 relate to the REVERSE INHIBIT mode D.

Initially, step SS1 is executed to determine whether or not the detected vehicle running speed V is equal to or higher than a predetermined reference value Cv1 stored in the ROM of the control device 460. This reference value Cv1, which is set at about 7–10 km/h, is used to determine whether the vehicle running speed V is higher than the level above which the shock produced by the operation of the reversing device 16 to its reverse position will cause a slip of the belt 44. If the vehicle speed V is lower than the reference value Cv1, step SS1 is followed by step SS2 to reset a flag XREV to zero, and step SS3 to determine whether the shift lever 252 is placed in the REVERSE position "R" or not. If the lever 252 is placed in the position "R", step SS7 is executed to set the flag XREV to "1". That is, the flag XREV is set to "1" when the vehicle is started in the REVERSE position "R", and set to "0" when the vehicle is started in the position other than the REVERSE position "R".

If the vehicle running speed V rises to the reference value Cv1, an affirmative decision (YES) is obtained in step SS1, and the control flow goes to step SS4 to determine whether the shift lever 252 is placed in the REVERSE position "R", or not. If not, it is not necessary to effect an operation in the REVERSE INHIBIT mode D. In this case, step SS5 is executed to determine whether or not the shift lever 252 is placed in the NEUTRAL or PARKING position "N", "P". If an affirmative decision (YES) is obtained in step SS5, the LOCK-UP CLUTCH RELEASE mode A is established, for releasing the lock-up clutch 36. As indicated in FIG. 23, the LOCK-UP CLUTCH RELEASE mode A is established by turning OFF both of the third and fourth solenoid-operated valves 330, 346. In this mode, the lock-up clutch 36 is released irrespective of the vehicle running speed V.

If a negative decision (NO) is obtained in step SS5, that is, if the shift lever 252 is placed in any one of the forward drive positions "D", "S" and "L", step SS9 is executed. If an affirmative decision (YES) is obtained in step SS4, i.e., if the REVERSE position "R" is selected, step SS6 is executed to determine whether the flag XREV is set at "1" or not. If the flag XREV is set at "1", this means that the position "R" remains selected, and therefore step SS8 is executed. If the flag XREV is not set at "1", i.e., is set at "0", this means that the shift lever 252 is operated from any forward drive position "D", "S" or "L" to the REVERSE position "R", and therefore the REVERSE INHIBIT mode D is established. Thus, steps SS1, SS2, SS4 and SS6 correspond to means for detecting that the shift lever 252 is operated from one of the forward drive positions "D", "S" and "L" to the REVERSE position "R".

If the shift lever 252 is operated from the DRIVE position "D" to the NEUTRAL position "N" and then to the REVERSE position "R" while the vehicle is running at a comparatively high speed not lower than the reference value Cv1, the negative decision (NO) is obtained in step SS6, and the REVERSE INHIBIT mode D is selected as described above. This mode D is established by turning OFF the third and fourth solenoid-operated valves 330 and 346. In this mode, the REVERSE INHIBIT valve 420 inhibits the supply of the fluid to the REVERSE brake 70, to thereby prevent the reversing device 16 from being brought to the reverse position, even if the shift lever 252 is operated to the REVERSE position "R".

As indicated above, the flag XREV is set to "1", if the vehicle is started with the shift lever 252 placed in the REVERSE position "R", and the vehicle speed V reaches the reference value Cv1, or if the shift lever 252 is operated to the REVERSE position "R" after the shift lever is once operated to the NEUTRAL position "N" at the vehicle speed V not lower than the reference value Cv1. Accordingly, the affirmative decision (YES) is obtained in step SS6, whereby the ACCUMULATOR BACK PRESSURE CONTROL mode C or LOCK-UP CLUTCH RELEASE mode A is eventually established. In these modes C and A, the third solenoid-operated valve 330 is turned OFF, and the reversing device 16 is permitted to be placed in the reverse position.

In the situations where the REVERSE INHIBIT mode D is not established and neither the position "N" nor position "P" is selected, step SS8 is executed if the position "R" is selected, and step SS9 is executed if the position "D", "S" or "L" is selected. In these steps SS8 and SS9, a difference Nd between the input and output shafts 38, 58 of the reversing device 16 is calculated, according to the following equations (6) and (7), respectively:

$$Nd = |Nout - Ip \cdot Npc| \quad (6)$$

$$Nd = |Nout - Npc| \quad (7)$$

where,
Nout: rotating speed of output shaft 38 of CVT 14
Npc: rotating speed of carrier 60 of device 16
Ip: gear ratio of the device 16 when placed in the reverse position The value Npc is obtained according to the following equation (8) based on the vehicle speed V, and the value Ip is obtained according to the following equation (9), based on the values Nout and Npc when the REVERSE brake 70 is fully engaged:

$$Npc = C/V \quad (8)$$

$$Ip = Nout/Npc \quad (9)$$

where, C: constant

Steps SS8 and SS9 ar followed by step SS10 to determine whether the speed difference Nd calculated as described above is larger than a reference value $C_N$ stored in the ROM, or not. This reference value $C_N$, which is about 30 rpm, for example, is used to determine whether the FORWARD clutch 72 or REVERSE brake 70 has been fully engaged or not. If a negative decision (NO) is obtained in step SS10, this means that the clutch 72 or brake 70 has been fully engaged, and therefore step SS12 and subsequent steps are executed. If an affirmative decision (YES) is obtained in step SS10, this means that the clutch 72 or brake 70 has not been fully engaged, and step SS11 is executed to determine whether a time after the start of a shifting operation from the position "N" or "P" to the position "D", "S" or "L" exceeds a predetermined reference time $C_T$ stored in the ROM, or not. This reference time $C_T$ is used to determine whether the time of engagement of the FORWARD clutch 72 or REVERSE brake 70 exceeds a nominal or normal engagement time. The time $C_T$ is slightly longer than the time normally required for the clutch 72 or brake 70 to be fully engaged. If the reference time $C_T$ has not elapsed after the start of shifting, step SS11 is followed by step SS12. If the reference time $C_T$ has elapsed, the ACCUMULATOR BACK PRESSURE CONTROL mode C is established.

If the negative decision (NO) is obtained in step SS10 or SS11 and the ACCUMULATOR BACK PRESSURE CONTROL mode C is not established, step SS12 is executed to determine whether the REVERSE position "R" is selected or not. If the position "R" is selected, the LOCK-UP CLUTCH RELEASE mode A is selected without execution of any subsequent steps. In this mode A, the third solenoid-operated valve 330 is placed in the OFF state with the shift lever 252 placed in the position "R", so as to prevent the reversing device 16 from being placed in the reverse position, namely, so as to permit the REVERSE brake 70 to be engaged to run the vehicle in the reverse direction.

If a negative decision (NO) is obtained in step SS12, step SS13 is implemented to determine whether the BRAKE switch 472 is in the ON state, or not. Then, step SS14 is implemented to determine whether the vehicle running speed is lower than a reference value Cv2 stored in the ROM. This reference value Cv2, which is about 40 Km/h, for example, is used to determine whether or not the condition for releasing the lock-up clutch 36 during brake application has been satisfied.

If the BRAKE switch 472 is ON and the vehicle speed V is lower than the reference value Cv2, namely, if the condition for releasing the lock-up clutch 36 has been satisfied, the control flow goes to step SS21 for selecting the LOCK-UP CLUTCH RELEASE mode A or LOCK-UP CLUTCH RAPID RELEASE mode B. More specifically, step SS21 is implemented to determine whether or not the currently selected hydraulic control mode is one of the LOCK-UP CLUTCH RELEASE and ACCUMULATOR BACK PRESSURE CONTROL modes A and C, which do not require a rapid releasing of the lock-up clutch 36. If an affirmative decision (YES) is obtained in step SS21, the LOCK-UP CLUTCH RELEASE mode A is selected. If a negative decision (NO) is obtained in step SS21, the control flow goes to step SS21 to determine whether the currently selected mode is the LOCK-UP CLUTCH RAPID RELEASE mode B or not. If the currently selected mode is not the mode B, step SS24 is executed to reset a time counter XLC to zero, and then the RAPID RELEASE mode B is selected. If the mode B is currently selected, step SS22 is followed by SS23 in which the time counter XLC is incremented. Step SS23 is followed by step SS24 to determine whether or not the current content of the time counter XLC exceeds a predetermined reference value Cs stored in the ROM. If the current count of the counter XLC is smaller than the reference value Cs, the LOCK-UP CLUTCH RAPID RELEASE mode B is maintained. If the count exceeds the reference value Cs, the LOCK-UP CLUTCH RELEASE mode A is selected. Thus, since the LOCK-UP CLUTCH RAPID RELEASE mode B is established for a relatively short time corresponding to the reference value Cs, it is possible to prevent the lock-up clutch rapid release valve 400 from rapidly draining the engaging chamber 33 of the fluid coupling 12 through the engaging line 322, which would cause the pressure in the fluid coupling 12 to be lowered, thereby causing bubbling within the coupling 12. The reference value Cs is determined to be shorter than a time within which the bubbling may occur in the fluid coupling 12.

If the BRAKE switch 472 is not ON or the switch 472 is ON but the vehicle speed V exceeds the reference value Cv2, step SS15 is implemented to determine whether the currently selected mode is one of the modes A, B and C which require the lock-up clutch 36 to be released. Steps SS15 and SS16–SS19 are implemented to determine the engagement or releasing of the lock-up clutch 36. If an affirmative decision (YES) is obtained in step SS15, step SS18 is executed to determine whether the speed Nin of the input shaft 30 is higher than a reference value ML2, or not. If the speed Nin is higher than the reference value ML2, step SS19 is implemented to determine whether the vehicle speed V is higher than a reference value Cv4 stored in the ROM. If the vehicle speed V is higher than the reference value Cv4, step SS20 is executed to determine whether the vehicle speed V is higher than a reference value Cv5. If the speed V is higher than the reference value Cv5, the 2ND LINE PRESSURE REDUCTION mode E is selected. If the speed V is equal to or lower than the reference value Cv5, the REVERSE INHIBIT mode D is selected. In these modes E and D wherein the third solenoid-operated valve 330 is placed in the ON state, the lock-up clutch 36 is engaged. If a negative decision (NO) is obtained in both steps SS18 and SS19, the normal LOCK-UP CLUTCH RELEASE mode A is selected. Namely, the lock-up clutch 36 is kept in the released state.

If the checking in step SS15 reveals that none of the modes A, B and C is selected, the control flow goes to step SS16 to determine whether the speed Nin is higher than a predetermined reference value ML1, or not. If an affirmative decision (YES) is obtained in step SS16, the control flow goes to step SS17 to determine whether the vehicle running speed V is higher than a predetermined reference value Cv3 stored in the ROM. If a negative decision (NO) is obtained in step SS16 or SS17, the LOCK-UP CLUTCH RELEASE mode A is selected. If an affirmative decision (YES) is obtained in both steps SS16 and SS17, step SS20 is executed to determine whether the vehicle speed V is higher than a reference value Cv5. If the vehicle speed V is higher than the reference value Cv5, the 2ND LINE PRESSURE REDUCTION mode E is selected. In this mode, the third and fourth solenoid-operated valves 330 and 346 are both placed in the ON state, so that the second line pressure Pl2 is lowered. If the vehicle speed V is equal to or lower than the reference value Cv5, the REVERSE INHIBIT mode D is selected, and the second line pressure Pl2 is normally regulated.

It will be understood from the foregoing explanation on steps SS15 through SS19 that the lock-up clutch 36 is engaged if the inequalities Nin>ML2 and V>Cv4 are satisfied when the lock-up clutch 36 is in the released state, and that the lock-up clutch 36 is released if the inequalities Nin<ML1 and V<Cv3 are satisfied when the lock-up clutch 36 is in the engaged state. The reference values ML1 and ML2 are determined based on the detected throttle opening angle $\theta$th, according to a function stored in the ROM of the control device 460, so that the reference values ML1 and ML2 increase with an increase in the throttle opening angle $\theta$th. For the same throttle opening angle $\theta$th, the reference value ML1 is set larger than the reference value ML2, for avoiding the control instability. The reference values Cv3 and Cv4 are set at values about 20 km/h, and the reference value Cv3 is set larger than the reference value Cv4 for the same reason as indicated above.

Referring back to the flow chart of FIG. 19, the control flow goes to step S10 after one of the hydraulic control modes A–E is selected. In step S10, the CPU of the control device 460 determines whether the ACCUMULATOR BACK PRESSURE CONTROL mode C is selected, or not. If the mode C is selected, step S10 is followed by step S11 in which the duty cycle Ds4 of the fourth solenoid-operated valve 346 is determined. Step S11 is followed by step S12. If the mode C is not selected, the control flow goes directly to step S12.

Figure 24:
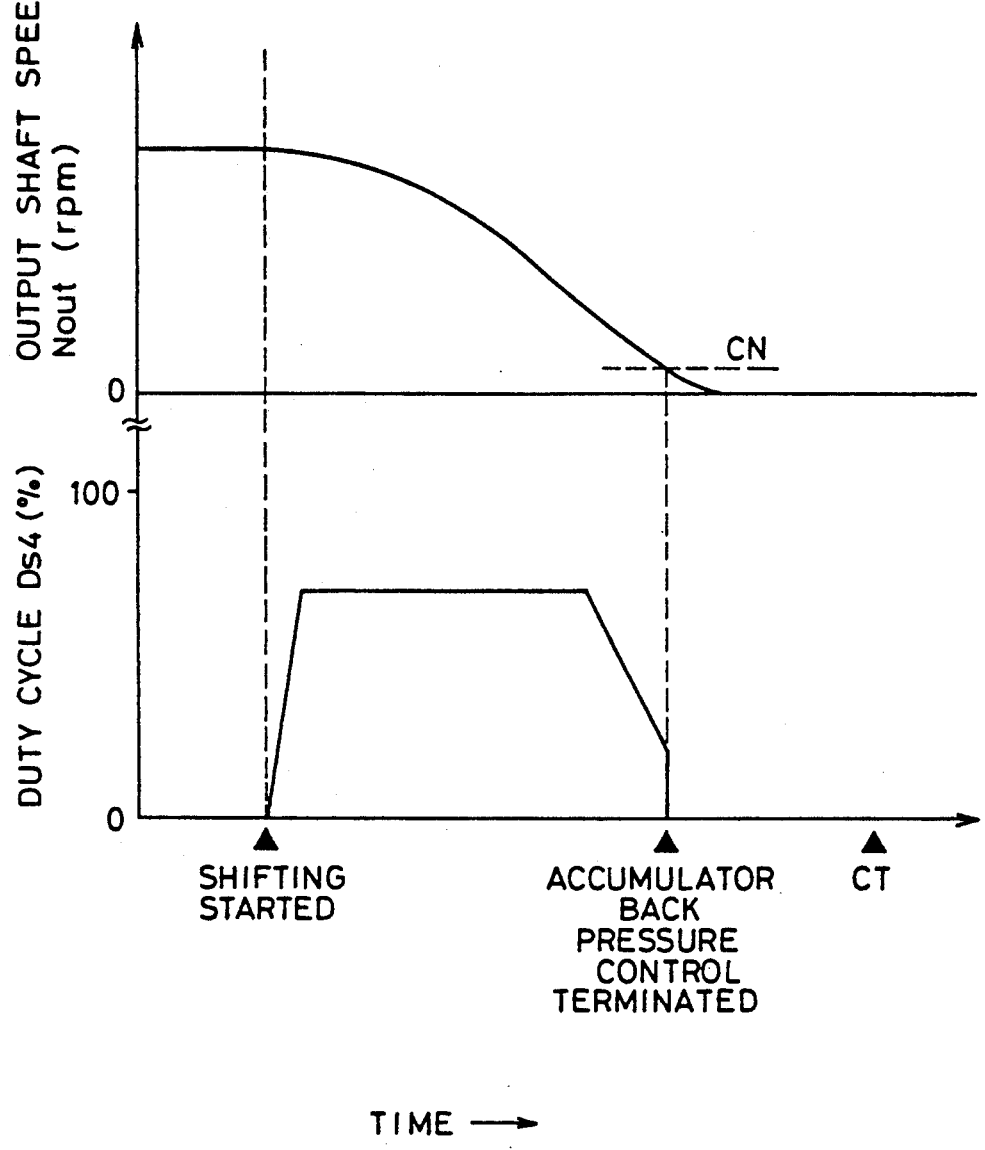
FIG. 24 is a time chart showing changes in the CVT output shaft speed and the duty cycle of the fourth solenoid valve, when the CVT is shifted to DRIVE position D.

The duty cycle Ds4 is determined so that the accumulators 342 and 340 are given suitable levels of back pressures for assuring smooth engagement of the FORWARD clutch 72 and REVERSE brake 70 when the shift lever 252 is shifted to any one of the forward drive positions "D", "S" and "L" or to the REVERSE position "R". The duty cycle Ds4 is determined from time to time, according to one of two predetermined functions (stored in the ROM) which include control parameters such as the speed Nin of the input shaft 30 upon shifting of the shift lever 252, and a time elapse "t" after the start of the shifting operation. The two functions correspond to the forward and reverse shiftings. The graph of FIG. 24 indicates a change in the duty cycle Ds4 with time in relation to the speed Nout of the output shaft 38, when the shift lever 252 is shifted from the NEUTRAL position "N" to the DRIVE position "D" while the vehicle is stopped.

In step S12, the control device 460 applies control signals to the first, second, third and fourth solenoid-operated valves 266, 268, 330 and 346, so that the solenoid coils of these valves are placed in the appropriate ON or OFF state or energized in the controlled duty cycle (for the valves 268 and 346), depending upon the CVT shift mode selected in step S4 and the hydraulic control mode selected in step S9.

It will be understood from the foregoing description of the hydraulic control circuit as described above that the directional control valve 262 of the shift control valve assembly 260 has: the drain port 278b; first line pressure port 278d receiving the first line pressure Pl1; second line pressure port 278f receiving the second line pressure Pl2; ports 278a, 278c, 278e and 278g connected to the respective first, second, third and fourth connecting lines 270, 272, 274 and 276; and spool 280 having four lands 279a, 279b, 279c and 279d, for connecting the drain port 278b and the first connecting line 270 and connecting the first line pressure port 278d and the third connecting line 274, when the first solenoid coil 265 of the first solenoid-operated valve 266 is energized (ON), and for connecting the first line pressure port 278f and the second connecting line 272 and connecting the second line pressure port 278d and the fourth connecting line 276 when the valve 268 is deenergized (OFF). In this arrangement, the speed ratio "e" of the CVT 14 is reduced so as to decelerate the vehicle when the first solenoid coil 265 is energized (ON). When the solenoid coil 266 is deenergized (OFF), the speed ratio "e" is increased so as to accelerate the vehicle. It will also be understood that the flow control valve 264 has: port 286b communicating with the first cylinder 56; port 286e communicating with the second cylinder 56; ports 286a, 286c, 286d and 286f connected to the respective first, second, third and fourth connecting lines 270, 272, 274 and 276; and spool 288 having three lands 287a, 287b–287c and 287d, for connecting the first connecting line 270 and the first cylinder 54 and connecting the third connecting line 274 and the second cylinder 56 when the second solenoid coil 267 of the second solenoid-operated valve 268 is deenergized, and for connecting the second connecting line 272 and the first cylinder 54 and connecting the fourth connecting line 276 and the second cylinder 56 when the solenoid coil 267 is energized. In this arrangement, the rate of increase in the speed ratio "e" of the CVT is held relatively low or restricted while the rate of decrease in the speed ratio "e" is not restricted, when the solenoid coil 267 is deenergized. When the solenoid coil 267 is energized, the rate of increase in the speed ratio "e" is not restricted while the rate of decrease is restricted.

In the present hydraulic control arrangement, each the spools 280 and 288 of the valves 262, 264 of the shift control valve assembly 260 has a relatively small number of lands. Namely, the spool 280 of the directional control valve 262 has the four lands while the spool 288 of the flow control valve 264 has functionally the three lands. Accordingly, the valves 262, 264 may be comparatively small-sized and the spools 280, 288 provide a relatively high operating response. The reduced mass of the spool 288 with the reduced number of lands assures relatively high durability of the valve 264, which is operated in the duty cycling manner in the CVT shift modes II and V.

Figure 25:
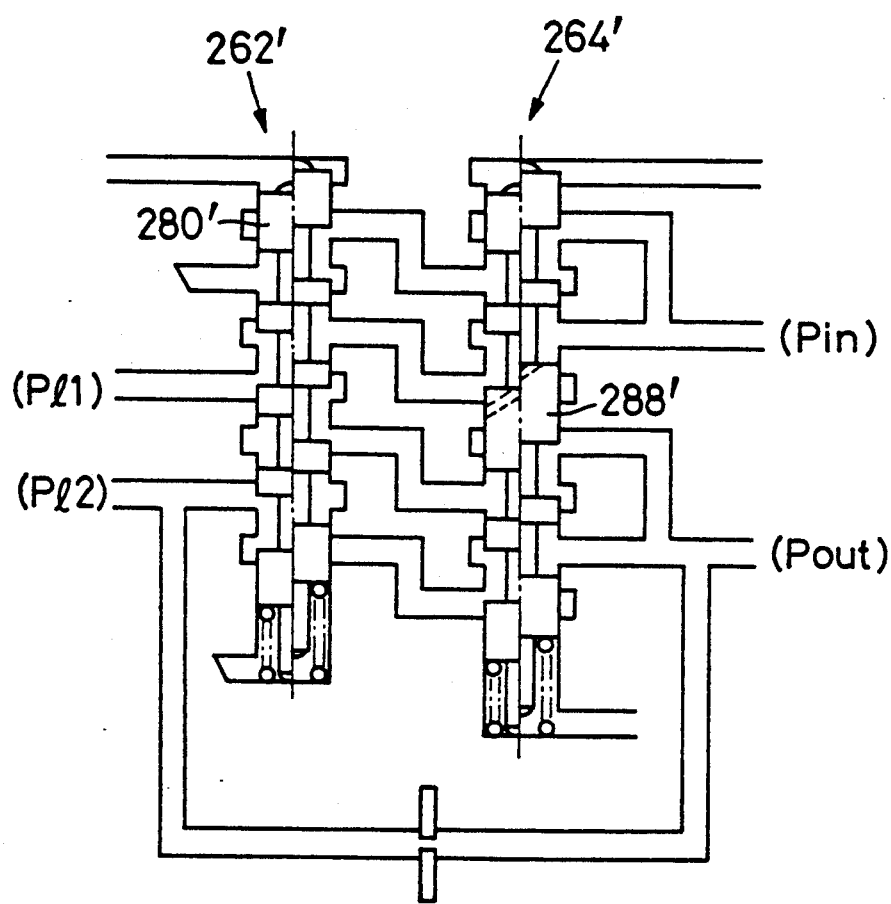
FIG. 25 is a view showing a directional control valve and a flow control valve of a conventional shift control valve assembly.

For comparison, there is illustrated in FIG. 25 a typical example of a conventionally used shift control valve assembly having a two-position directional control valve 262' and a two-position flow control valve 264', which are simply adapted t the hydraulic control circuit described above, in place of the valve assembly 260, for applying the first and second line pressures Pl1 and Pl2 to the one and the other of the two cylinders 54, 56. As shown in the figure, each of valve spools 280' and 288' of the valves 262' and 264' has five lands, requiring a relatively large axial length and a relatively large mass. Accordingly, the valves 262' and 264' tend to be large-sized, and the operating response is accordingly deteriorated. The increased mass of the spool 288' is undesirable in terms of the operating durability, because the valve 264 is reciprocated with the controlled duty cycle of the corresponding solenoid coil.

While the first solenoid-operated valve 266 is ON, the CVT 14 is shifted down at a relatively high rate when the second solenoid-operated valve 268 is OFF, at a medium rate when the valve 268 is duty-cycled, and at a relatively low rate when the valve 268 is ON. While the valve 266 is OFF, the CVT 14 is shifted up at a relatively low rate when the valve 268 is OFF, at a medium rate when the valve 268 is duty-cycled, and at a relatively high rate when the valve 268 is ON. In controlling the speed ratio "e" in the feedback manner for coincidence of the input shaft speed Nin with the desired or target speed Nin*, the CVT 14 favorably tends to be slowly shifted to increase or reduce the speed ratio "e" at the relatively low rates, even if the spool 280 of the directional control valve 262 sticks at a given position between the stroke ends.

It is also noted that the hydraulic control apparatus described above has the by-pass line 295 connecting the second pressure line 82 and the second hydraulic cylinder 56. The by-pass line 295 is equipped with the flow restrictor 296 and the one-way valve in the form of the check valve 298, which are connected in parallel with each other. The one-way valve 298 permits the fluid flow only in the direction toward the second cylinder 56. In this arrangement, the flow restrictor 296 functions to release the upper peak of the spike of the pulsation of the pressure Pout in the the second cylinder 56, which may occur due to the duty-cycling operation of the valve assembly 260, while the one-way valve 298 functions to instantaneously supply the fluid from the second pressure line 82 to the cylinder 56, thereby compensating for a drop of the pressure Pout due to the pulsation. Thus, the present arrangement is effectively to minimize the influence of the pulsation of the pressure Pout. Further, the fluid supply to the second cylinder 56 through the one-way valve 298 eliminates a drop of the pressure Pout due to leakage.

The check valve 298 serving as the one-way valve described above has: the seat 299 having a flat surface; valve member 301 having a flat operating surface abutable on the seat 299; and spring 303 biasing the valve member 301 against the seat 299. Although the valve member 301 abuts on the seat 299 repeatedly in synchronization with the duty cycling operation of the flow control valve 264, the valve 298 having the flat seat 299 and valve member 301 is more durable than a valve having a spherical valve member.

In the shift control valve assembly 260 described above, the second connecting line 272 serves primarily as a first fluid passage having the flow restrictor 271 as a first flow restrictor, through which the fluid is supplied from the directional control valve 262 to the first cylinder 54, so that the flow of the fluid from the first pressure line 80 toward the first cylinder 56 is restricted by the first flow restrictor 271 when the CVT 14 is shifted up. When the CVT 14 is shifted down, on the other hand, the third connecting line 274 serves primarily as a second fluid passage through which the fluid from the first pressure line 80 is supplied from the directional control valve 262 toward the second cylinder 56. In this arrangement, the first flow restrictor 271 gives a comparatively higher resistance to the flow of the fluid through the second connecting line 272 in the direction that causes the CVT 14 to be shifted up, whereby the shifting of the CVT 14 to increase the speed ratio "e" is effected at a lower speed than the shifting to reduce the speed ratio. In other words, the present hydraulic control apparatus adapted to restrict the shift-up speed of the CVT 14 does not have a complicated controller for continuously changing the rates of flows of the fluid to the first and second cylinders 54, 56, whereby the electronic control device for controlling the hydraulic circuit may be simplified.

Further, the flow restrictor 273 serves as a second flow restrictor disposed in a portion of the first cylinder line 300 communicating with the first cylinder 54, which is located between the flow control valve 264, and the branch line 305 for applying the pressure Pin in the cylinder 54 to the chamber 157 of the first pressure regulating valve 100. Since the first line pressure Pl1 regulated by the first pressure regulating valve 100 is higher than the pressure Pin in the first cylinder 54 by a suitable amount, a pressure pulsation may be produced upon duty-cycling operation of the flow control valve 264. However, the second flow restrictor 273 prevents the produced pressure pulsation from being transmitted to the first pressure regulating valve 100 through the branch line 305, whereby the pulsation of the first line pressure Pl1 is prevented.

Figure 26:
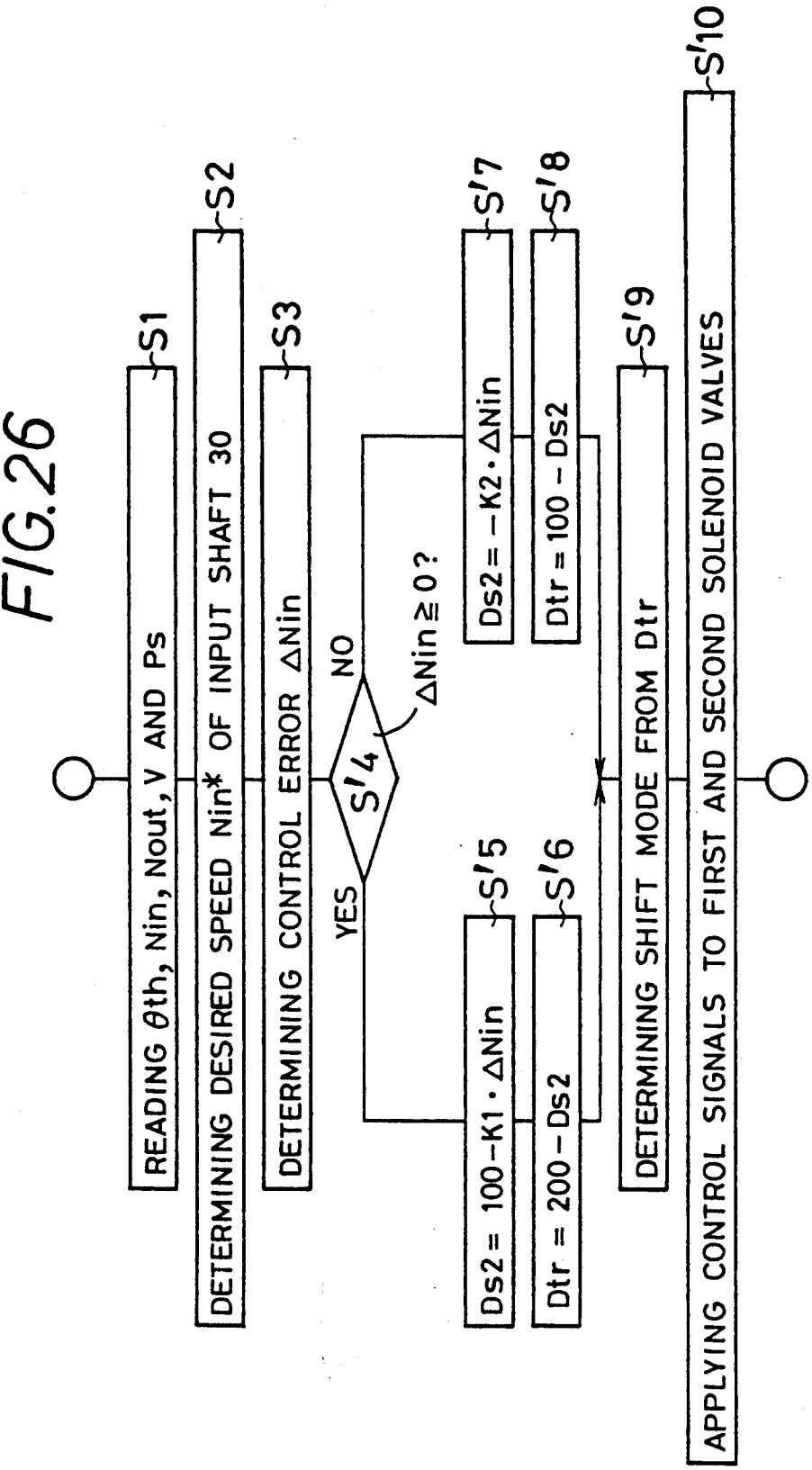
FIG. 26 is a flow chart illustrating an operation of a hydraulic control apparatus according to a modified embodiment of the invention.
Figure 27:
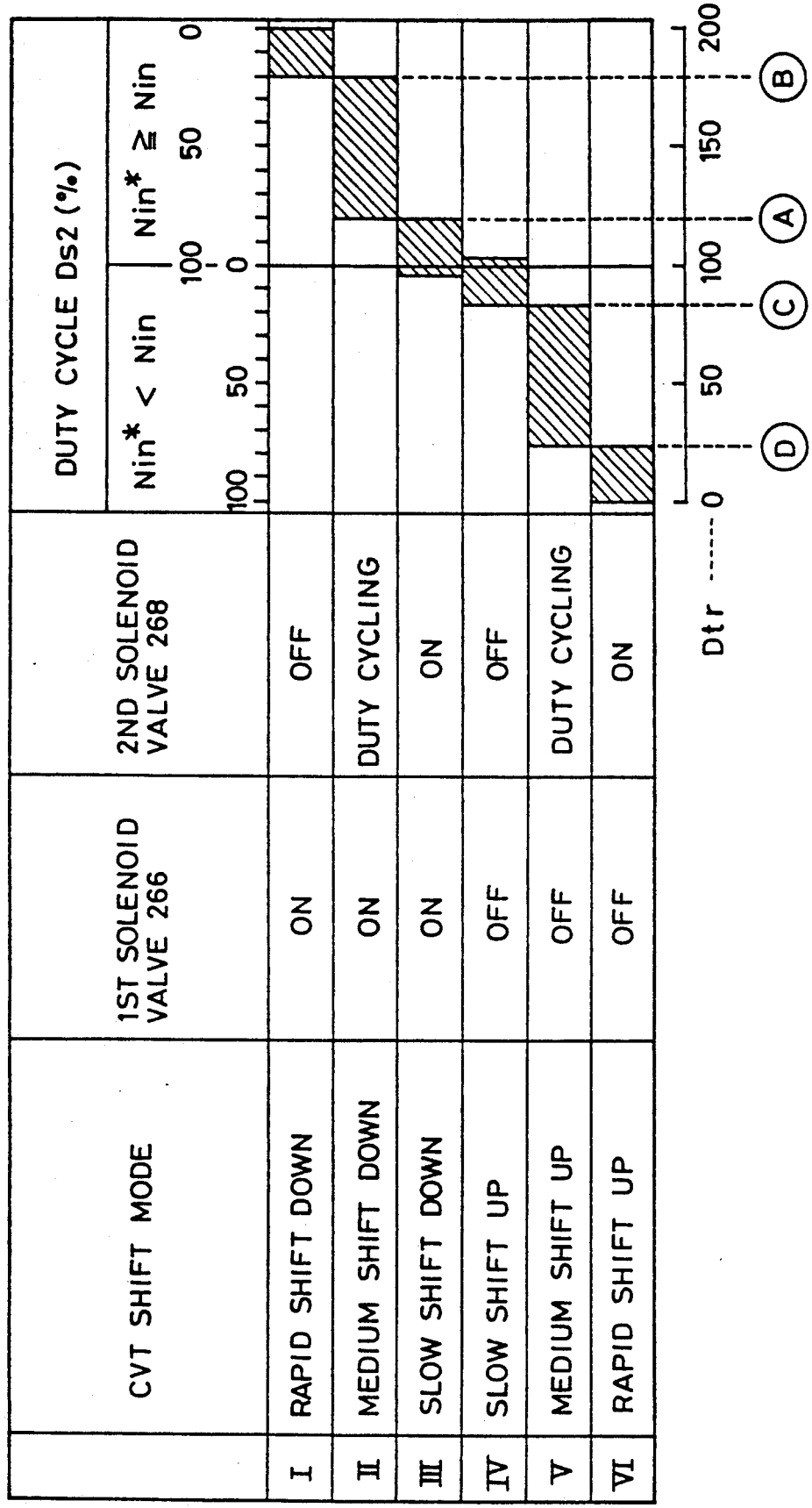
FIG. 27 is a view indicating a relationship between ranges of an control error amount of the CVT input shaft speed of different CVT shifting modes, in relation to the on-off states of first and second solenoid valves of the shift control valve assembly, duty cycle of the second solenoid valve and conversion value, Dtr, in the embodiment of FIG. 26.

Referring next to FIG. 26, there is illustrated an operation to control the first and second solenoid-operated valves 266 and 268 of the shift control valve assembly 260, according to another embodiment of the present invention. FIG. 27 shows a relationship between ranges of the control error amount ΔNin and the different CVT shift modes I-VI, in relation to the on-off states of the first and second solenoid-operated valves 266, 268 (solenoid coils 265, 267), duty cycle Ds2 of the second solenoid-operated valve 268, and a conversion value Dtr (which will be described).

In the present modified embodiment, too, the ranges of the control error amount ΔNin corresponding to the CVT shift modes III and IV overlap each other, around the zero value of the control error ΔNin, in order to provide a hysteresis for avoiding the instability in controlling the speed ratio "e". This arrangement results in maintaining the SLOW SHIFT DOWN mode III or RAPID SHIFT UP mode IV which has been established by the time of determination of the CVT shift mode. It is also noted that the range of the control error amount ΔNin corresponding to the MEDIUM SHIFT DOWN mode II does not overlap the ranges corresponding to the RAPID SHIFT DOWN and SLOW SHIFT DOWN modes I and III, and that the range corresponding to the MEDIUM SHIFT UP mode V does not overlap the ranges corresponding to the SLOW SHIFT UP and RAPID SHIFT UP modes IV and VI. However, this does not cause any problem, since the speed ratio "e" of the CVT 14 is changed at different rates, but in the same direction (either shift-down direction or shift-up direction) even when the adjacent modes (I and II; II and III; IV and V; or V and VI) are alternately selected. Of course, the corresponding adjacent ranges of the control error amount ΔNin may overlap each other by a suitable amount.

Figure 28:
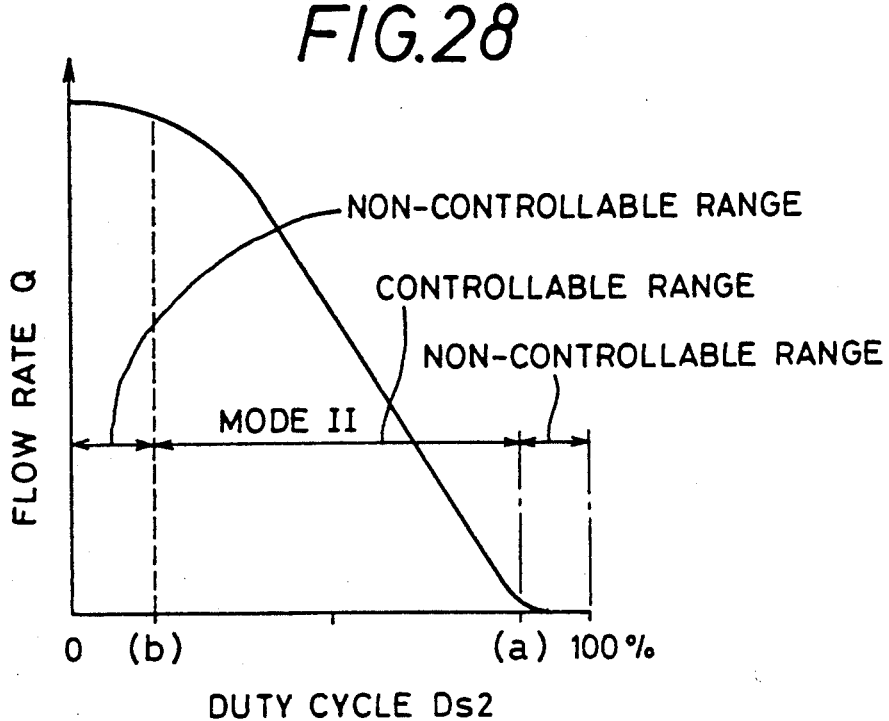
FIGS 28 and 29 are graphs indicating relationships between the duty cycle of the second solenoid valve, and the flow rate of the flow control valve shown in FIG. 9, the graph of FIG. 28 relating to the shift-down modes of the CVT while that of FIG. 29 relating to the shift-up modes of the CVT.
Figure 29:
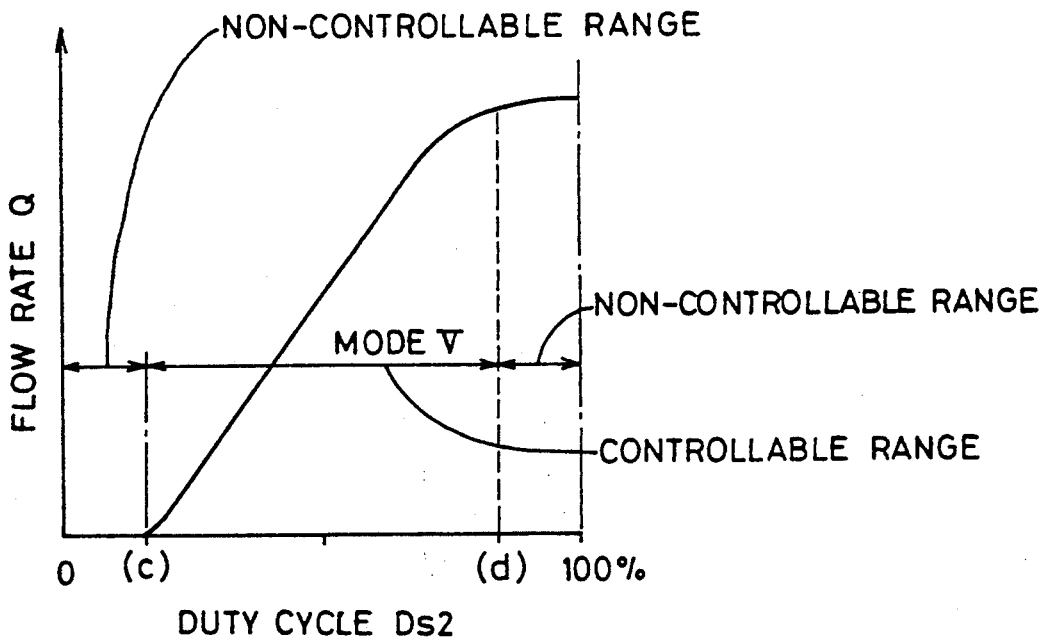

With the duty-cycling energization of the second solenoid-operated valve 268, the flow rate Q of the fluid controlled by the flow control valve 264 varies with the duty cycle Ds2 of the second solenoid coil 267, as indicated in FIG. 28 when the CVT 14 is shifted down (when the speed ratio "e" is reduced). When the CVT 14 is shifted up (when the speed ratio "e" is increased), the flow rate Q varies with the duty cycle Ds2, as indicated in FIG. 29. In each of the two cases of FIGS. 28 and 29, there exist two non-controllable ranges near the duty cycle Ds2 of 0% and 100%, in which the flow rate Q does not vary in an effective degree with the change in the duty cycle Ds2. These non-controllable ranges exist due to the inertia of the spool 288 of the flow control valve 268, inductance of the solenoid coil 267 of the solenoid-operated valve 268 and viscosity and compressibility of the working fluid. Between the two non-controllable ranges, on the other hand, there exists a controllable range in which the flow rate Q effectively changes with the duty cycle Ds2, in both cases of FIGS. 28 and 29. The ends of these controllable ranges are indicated at (a) and (b) in FIG. 28, and at (c) and (d) in FIG. 29. In other words, the ends (a) and (b), and (c) and (d) of the controllable ranges represent the boundary values of the duty cycle Ds2, which define the boundaries between the SLOW SHIFT DOWN mode III and the MEDIUM SHIFT DOWN mode II, between the MEDIUM SHIFT DOWN mode II and the RAPID SHIFT DOWN mode I, between the SLOW SHIFT UP mode IV and the MEDIUM SHIFT UP mode V, and between the MEDIUM SHIFT UP mode V and the RAPID SHIFT UP mode VI. If the boundary duty cycle values indicated at (b) and (c) are 20%, while the boundary duty cycle values indicated at (a) and (d) are 80%, for example, the duty cycle Ds2 of the solenoid-operated valve 268 are changed over a range of 20-80% when the MEDIUM SHIFT DOWN or MEDIUM SHIFT UP mode II or V is selected.

In the present embodiment of FIGS. 26-29, the first and second solenoid-operated valves 266 and 268 ar controlled as shown in the flow chart of FIG. 26, in which the steps S1, S2 and S3 are the same as the corresponding steps in the flow chart of FIG. 19.

In the following steps S'4-S'8, the above-indicated conversion value Dtr is determined, and steps S'6 and S'8 are followed by step S'9 in which one of the CVT shift modes of FIG. 27 is selected based on the determined conversion value Dtr, so as to zero the control error amount ΔNin which was determined in step S3.

In step S'4, a determination is made as to whether or not the control error ΔNin is equal to or greater than zero. If the control error ΔNin is equal to or greater than zero, this indicates that the actual speed Nin of the input shaft 30 of the CVT 14 is lower than the determined desired value Nin*. In this case, the speed ratio "e" is reduced to increase the input shaft speed Nin. To this end, step S'5 is executed to calculate the duty cycle Ds2 (%) according to the following equation (10), so as to shift down the CVT 14:

$$Ds2 = 100 - K1 \cdot \Delta Nin \quad (10)$$

where, K1: gain

Step S'5 is followed by step S'6 in which the conversion value Dtr is calculated based on the calculated duty cycle Ds2, according to the following equation (11):

$$Dtr = 200 - Ds2 \quad (11)$$

In the case where the determination in step S'4 indicates that the control error $\Delta Nin$ is smaller than zero, this means that the actual input shaft speed Nin is higher than the desired value Nin*. In this case, the speed ratio "e" is increased to reduce the input shaft speed Nin. To this end, step S'7 is executed to calculate the duty cycle Ds2 (%) according to the following equation (12), so as to shift up the CVT 14:

$$Ds2 = -K2 \cdot \Delta Nin \quad (12)$$

where, K2: gain

Step S'7 is followed by step S'8 in which the conversion value Dtr is calculated based on the duty cycle Ds2 calculated in step S'7, according to the following equation (13):

$$Dtr = 100 - Ds2 \quad (13)$$

In the present embodiment, steps S'5 and S'7 correspond to means for determining the direction and amount of operation of the CVT 14, i.e., operating states of the first and second solenoid-operated valves.

The above equations (11) and (12) are used to obtain the conversion value Dtr which varies continuously so as to cover the ranges of the control error amount $\Delta Nin$ corresponding to the six CVT shift modes I through VI. Thus, the appropriate one of the six modes is selected based on the single value Dtr. The conversion value Dtr of "100" corresponds to the control error $\Delta Nin$ of "0", i.e., duty cycle Ds2 of 0% of the valve 268 during the shift-up operation of the CVT 14, and duty cycle Ds2 of 100% during the shift-down operation. Further, the conversion value Dtr of "0" corresponds to the duty cycle Ds2 of 100% during the shift-up operation, while the conversion value Dtr of "200" corresponds to the duty cycle Ds2 of 0% during the shift-down operation. If the boundary duty cycle values (b) and (c) are 20%, and the boundary duty cycle values (a) and (d) are 80%, these boundary duty cycle values (d), (c), (a) and (b) correspond to the conversion values "20", "80 ", "120" and "180", respectively.

In step S'9, one of the six modes is selected based on the conversion values Dtr calculated in step S'6 or S'8, according to the relationship as indicated in FIG. 27. In the present embodiment, step S'9 corresponds to the means for selecting or determining one of the CVT shift modes. In the following step S'10, the control signals are applied to the first and second solenoid-operated valves 266 and 268, so as to establish the selected shift mode, so that the speed ratio "e" of the CVT 14 is adequately controlled. The steps of the flow chart of FIG. 26 are repeatedly executed for controlling the CVT 14.

As described above, the boundary duty cycle values (a) and (b), or (c) and (d) are determined so as to define the controllable range in which the flow rate Q is effectively changed with the duty cycle Ds2 of the second solenoid-operated valve 268 for the flow control valve 264, such that the controllable range is intermediate between and adjacent to the two non-controllable ranges for each of the shift-down and shift-up operations. The controllable ranges correspond to the MEDIUM SHIFT DOWN and MEDIUM SHIFT UP modes II and V, and the duty cycle value Ds2 (conversion value Dtr) for controlling the flow control valve 264 is determined in steps S'6–S'8 (S'9) based on the actually detected control error amount $\Delta Nin$. The determined duty cycle value Ds2 is compared with the boundary duty cycle values (a) and (b), or (c) and (d), in order to make selection between the MEDIUM SHIFT DOWN mode II and the RAPID SHIFT DOWN mode I, between the MEDIUM SHIFT DOWN mode II and the SLOW SHIFT DOWN mode III, between the MEDIUM SHIFT UP mode V and the SLOW SHIFT UP mode IV, and between the MEDIUM SHIFT UP mode V and the RAPID SHIFT UP mode VI. If the CVT shift mode is changed from the mode III to the mode II, the duty cycle Ds2 (conversion value Dtr) determined in steps S'6–S'8 based on the control error amount $\Delta Nin$ according to the equation (10) or (12) stored in the ROM of the control device 460 is a value corresponding to the boundary duty cycle value (a) between the controllable range and the adjacent non-controllable range of the flow control valve 264. Consequently, even if the gain K1 or K2 of the equation (10) or (12) fluctuates in relation to the vehicle running speed V or speed Nout of the CVT output shaft 38, the flow rate Q in the newly selected MEDIUM SHIFT DOWN MODE II is almost equal to that in the previously selected SLOW SHIFT DOWN mode II, whereby the speed ratio "e" may be smoothly changed. In other words, the change of the mode from the mode III to the mode II will not cause a sudden change in the flow rate Q, which would deteriorate the driving comfort of the vehicle.

It is noted that an intricate control of the speed ratio "e" is not necessary when the control error amount $\Delta Nin$ is considerably large or considerably small. In this respect, the present embodiment is adapted to select the slow shifting mode III or IV, when the error amount $\Delta Nin$ is considerably small, and the rapid shifting mode I or VI when the error amount is considerably large. Accordingly, the need to effect the duty-cycling operation of the second solenoid-operated valves 268 is reduced, whereby the durability of the valve 268 is improved.

In the embodiment of FIGS. 26-29, the boundary duty cycle values (a) and (b), and (c) and (d) used for effect selection between the modes II and I or III, and between the modes V and IV or VI correspond to the boundaries between the controllable and non-controllable ranges as indicated in FIGS. 28 and 29. However, these boundary duty cycle values (a)-(d) may correspond to the control error amounts $\Delta Nin$ adjacent to or near the boundaries between the controllable and non-controllable ranges. If the values (a) and (b), or (c) and (d) are made nearer to each other without deteriorating the feedback control smoothness or stability, the durability of the second solenoid-operated valve 268 and the flow control valve 264 are further improved.

Further, the gains K1 and K2 used in the equations (10) and (12) may be determined according to the following functional equation (14):

$$K1, K2 = f(e, V \text{ or } Nout) \quad (14)$$

Since the operating response of the CVT 14 is improved as the speed ratio "e" is increased and as the vehicle running speed V is increased, the functional equation (14) is determined so that the gains K1 and K2 increase with an increase in the speed ratio "e" and with an increase in the vehicle running speed V or output shaft speed Nout.

The equations (10) and (12) used in the embodiment of FIGS. 26–29 are adapted to change the duty cycle Ds2 in proportion to the control error amount ΔNin. However, the duty cycle Ds2 may be determined according to the following equation (15), by adding a value proportional to the integrated value of the control error amount ΔNin, to the value proportional to the control error amount.

$$Ds2 = K1 \cdot \Delta Nin + K2 \int \Delta Nin \, dt + K3 \cdot \frac{d}{dt} \Delta Nin \quad (15)$$

where, K1, K2, K3: constants

In the embodiment of FIGS. 26–29, the four boundary duty cycle values (a), (b), (c) and (d) are used. However, the advantage as described above with respect to this embodiment may be more or less enjoyed even when at least one boundary duty cycle value is provided to effect at least one of the following selections: between the MEDIUM SHIFT DOWN mode II and the RAPID SHIFT DOWN mode I; between the MEDIUM SHIFT DOWN mode II and the SLOW SHIFT DOWN mode III; between the MEDIUM SHIFT UP mode V and the SLOW SHIFT UP mode IV; and between the MEDIUM SHIFT UP mode V and the RAPID SHIFT UP mode VI.

While the two presently preferred embodiments of the invention have been described, various changes, modifications and improvements may be made in the invention.

For example, the combination of the CVT 14 and the reversing device 16 used in the illustrated embodiments may be replaced by a well-known automatic multiple-position transmission such as a planetary gear type transmission.

While the shift control valve assembly 260 used in the illustrated embodiments consists of the directional control valve 262 and the flow control valve 264, the assembly 260 may be replaced by a four-way flow control valve using a linear solenoid capable of continuously changing the flow rate.

In the illustrated embodiments, the THROTTLE pressure Pth produced by the throttle sensing valve 180 which detects the throttle opening angle $\theta$th is used as a pressure representative of the currently required output of the engine 10. Where the hydraulic control apparatus of the invention is used for a vehicle having a diesel engine without a throttle valve, the pressure Pth may be replaced by a pressure which represents an amount corresponding to an amount of operation of an accelerator pedal of the vehicle. In this case, the cam 184 is mechanically linked with the accelerator pedal, so that the cam 184 is rotated as the pedal is depressed.

While the illustrated embodiments are adapted such that the speed ratio "e" of the CVT 14 is controlled so that the actually detected speed Nin of the input shaft 30 coincides with a determined desired or target speed Nin*, it is possible to control the speed ratio "e" so that the actually detected speed ratio "e" coincides with a determined desired ratio "e*", since the speed ratio "e" is equal to Nout/Nin.

The reversing device 16 which is located between the output shaft 38 of the CVT 14 and the intermediate gear device 18 in the illustrated embodiments, may be disposed between the fluid coupling 12 and the input shaft 30 of the CVT 14. The reversing device 16 may have two or more forward drive positions in addition to the reverse position.

The fluid coupling 12 may be replaced by other couplings or torque converters.

In the illustrated embodiments, the first and second line pressures Pl1 and Pl2 are applied to the one and the other of the two cylinders 54, 56 under the control of the shift control valve assembly 260 to control the speed ratio "e" of the CVT 14. However, the speed ratio "e" may be controlled such that the line pressure is kept applied to the driven side cylinder 56 (54), while the fluid is supplied to or discharged from the driving side cylinder 54 (56) under the control of a shift control valve assembly, as disclosed in laid-open Publication No. 60-95262.

What is claimed is:

1. A hydraulic control apparatus for a power transmitting system for an automotive vehicle having a continuously variable transmission which has a first and a second shaft, a pair of variable-diameter pulleys provided on the first and second shafts, respectively, a belt connecting the pulleys, and a pair of hydraulic actuators for changing effective diameters of the pulleys, the apparatus including a directional control valve for supplying a working fluid from a pressure line to one of said pair of hydraulic actuators while discharging the working fluid from the other hydraulic actuator, for controlling a speed ratio of the transmission, wherein the improvement comprises:
   a first fluid passage connected to said directional control valve, for primarily supplying said working fluid from said pressure line to a driving side actuator of said pair of hydraulic actuators which is provided on a driving one of said first and second shafts;
   a second fluid passage connected to said directional control valve, for primarily supplying the working fluid from said pressure line to a driven side actuator of said pair of hydraulic actuators; and
   flow restrictor means for restricting a flow of the fluid through said first fluid passage so that a fluid flow resistance of said first fluid passage is higher than a fluid flow resistance of said second fluid passage.

2. A hydraulic control apparatus according to claim 1, wherein said directional control valve is a two-position valve having a first and a second position, said apparatus further comprising:
   a two-position flow control valve disposed between said directional control valve and said pair of hydraulic actuators, and cooperated with said directional control valve to control said speed ratio of said transmission such that said directional control valve is operated selectively to one of said first and second positions while a duty cycle of said flow control valve is controlled;
   a first pressure line as said pressure line for applying a first line pressure to said one of said pair of hydraulic actuators;

a second pressure line for applying a second line pressure lower than said first line pressure, to said other hydraulic actuator;

a by-pass line connecting said second pressure line and an actuator of said pair of hydraulic actuators which is provided on one of said first and second shafts which is located nearer to drive wheels of the vehicle;

a one-way valve disposed in said by-pass line, for permitting a flow of the fluid therethrough in a direction from said second pressure line toward said actuator provided on the shaft nearer to said drive wheels; and a flow restrictor disposed in said by-pass line, in parallel with said one-way valve.

3. A hydraulic control apparatus according to claim 1, wherein said directional control valve is a two-position valve having a first and a second position for increasing and reducing the speed ratio of the transmission, respectively, said apparatus further comprising:

a first solenoid coil for operating said directional control valve selectively to said first and second positions;

a two-position flow control valve disposed between said directional control valve and said driving and driven side actuators, and having a first and a second position for changing the speed ratio of the transmission at respective two different rates;

a second solenoid coil for operating said flow control valve selectively to said first and second positions; and means for applying a first line pressure and a second line pressure lower than said first line pressure to said one and other hydraulic actuators, respectively, said speed ratio of the transmission being increased or reduced with said first and second line pressures applied to said one and other hydraulic actuators, respectively, depending upon a selected one of said first and second positions of said directional control valve, at one of said two rates depending upon a selected one of said first and second positions of said flow control valve, said directional control valve having a drain port, a first line pressure port receiving said first line pressure, a second line pressure port receiving said second line pressure, four ports respectively connected to a first, a second, a third and a fourth connecting line, a spool having four lands for connecting said drain port and said first connecting line and connecting said first line pressure port and said third connecting line when said first solenoid coil is placed in one of energized and deenergized states thereof, and for connecting said first line pressure port and said second connecting line and connecting said second line pressure port and said fourth connecting line when said first solenoid coil is placed in the other of said energized and deenergized states, said flow control valve having a port communicating with said driving side actuator, a port communicating with a driven side actuator of said pair of hydraulic actuators which is provided on a driven one of said first and second shafts, four ports respectively connected to said first, second, third and fourth connecting lines, and a spool having three lands, for connecting said first connecting line and said driving side actuator and connecting said third connecting line and said driven side actuator when said second solenoid coil is placed in one of energized and deenergized states thereof, and for connecting said second connecting line and said driving side actuator and connecting said fourth connecting line and said driven side actuator when said second solenoid coil is placed in the other of said energized and deenergized states.

4. A hydraulic control apparatus according to claim 1, further comprising:

a two-position flow control valve for regulating a rate of flow of the fluid therethrough, having an open and a closed position for respectively selecting a first rapid and a second slow shifting mode in which the speed ratio of the transmission is rapidly and slowly changed, respectively, a duty cycle of said flow control valve being controlled so as to provide a third medium-speed shifting mode in which the speed ratio is changed at a rate intermediate between rates of change in said first and second shifting modes, the speed ratio of the transmission being controlled in a selected one of at least two of said first, second and third shifting modes, so that a control error of said speed ratio is zeroed;

means for determining said control error;

means for determining a duty cycle at which said flow control valve is operated so as to zero the detected control error and means for determining at least one boundary duty cycle value each substantially corresponding to a boundary between a controllable range and a non-controllable range of the rate of flow of the fluid through said flow control valve, said rate of flow of the fluid effectively varying with the duty cycle of the flow control valve over said controllable range, and not effectively varying with the duty cycle within said non-controllable range; and mode selecting means for selecting said one of at least two of said first, second and third shifting modes, by comparing the determined duty cycle with said at least one boundary duty cycle value.

5. A hydraulic control apparatus for a power transmitting system for an automotive vehicle having a continuously variable transmission which has an input and an output shaft, a pair of variable-diameter pulleys provided on the input and output shafts, respectively, a belt connecting the pulleys, and a first and a second hydraulic actuator which are respectively provided on said input and output shafts, for changing effective diameters of the pulleys, said apparatus including a two-position directional control valve having a first and a second position, for applying a first line pressure from a first pressure line to one of said first and second hydraulic actuators while applying a second line pressure from a second pressure line to the other of said hydraulic actuators, and a two-position flow control valve disposed between said directional control valve and said hydraulic actuators and whose duty cycle is controlled so as to control a rate of flow of a working fluid therethrough, whereby a speed ratio of said transmission is changed at a controlled rate, wherein the improvement comprises:

a by-pass line connecting said second pressure line to said second hydraulic actuator;

a one-way valve disposed in said by-pass line, for permitting a flow of the fluid therethrough in a direction from said second pressure line toward said second hydraulic actuator; and a flow restrictor disposed in said by-pass line, in parallel with said one-way valve.

6. A hydraulic control apparatus for a power transmitting system for an automotive vehicle having a continuously variable transmission which has a first and a second shaft, a pair of variable-diameter pulleys provided on the first and second shafts, respectively, a belt connecting the pulleys, and a pair of hydraulic actuators for changing effective diameters of the pulleys, said apparatus including means for applying a first line pressure and a second line pressure lower than said first line pressure to one and the other of said pair of hydraulic actuators, respectively, so as to control a speed ratio of said transmission, wherein the improvement comprises:
- a two-position directional control valve having a first and a second position for increasing and reducing the speed ratio of the transmission, respectively;
- a first solenoid coil for operating said directional control valve selectively to said first and second positions;
- a two-position flow control valve disposed between said directional control valve and said pair of hydraulic actuators, and having a first and a second position for changing the speed ratio of the transmission at respective two different rates; and
- a second solenoid coil for operating said flow control valve selectively to said first and second positions,
- said directional control valve having a drain port, a first line pressure port receiving said first line pressure, a second line pressure port receiving said second line pressure, four ports respectively connected to a first, a second, a third and a fourth connecting line, a spool having four lands for connecting said drain port and said first connecting line and connecting said first line pressure port and said third connecting line when said first solenoid coil is placed in one of energized and deenergized states thereof, and for connecting said first line pressure port and said second connecting line and connecting said second line pressure port and said fourth connecting line when said first solenoid coil is placed in the other of said energized and deenergized states,
- said flow control valve having a port communicating with said driving side actuator, a port communicating with a driven side actuator of said pair of hydraulic actuator which is provided on a driven one of said first and second shafts, four ports respectively connected to said first, second, third and fourth connecting lines, and a spool having three lands, for connecting said first connecting line and said driving side actuator and connecting said third connecting line and said driven side actuator when said second solenoid coil is placed in one of energized and deenergized states thereof, and for connecting said second connecting line and said driving side actuator and connecting said fourth connecting line and said driven side actuator when said second solenoid coil is placed in the other of said energized and deenergized states.

7. A hydraulic control apparatus for a power transmitting system for an automotive vehicle having a continuously variable transmission, hydraulic actuator means for controlling a speed ratio of the transmission, and a two-position flow control valve connected to said hydraulic actuator means, for regulating a rate of flow of a working fluid therethrough so as to control a rate of change in said speed ratio, said flow control valve having an open and a closed position for respectively selecting a first rapid and a second slow shifting mode in which the speed ratio of the transmission is rapidly and slowly changed, respectively, a duty cycle of said flow control valve being controlled so as to provide a third medium-speed shifting mode in which the speed ratio is changed at a continuously variable rate intermediate between rates of change in said first and second shifting modes, the speed ratio of the transmission being controlled in a selected one of at least two of said first, second and third shifting modes, so that a control error associated with said speed ratio is zeroed, wherein the improvement comprises:
- means for determining said control error;
- means for determining a duty cycle at which said flow control valve is operated so as to zero the detected control error;
- means for determining at least one boundary duty cycle value each substantially corresponding to a boundary between a controllable range and a non-controllable range of the rate of flow of the fluid through said flow control valve, said rate of flow of the fluid effectively varying with the duty cycle of the flow control valve over said controllable range, and not effectively varying with the duty cycle within said non-controllable range; and
- mode selecting means for selecting said one of at least two of said first, second and third shifting modes, by comparing the determined duty cycle with said at least one boundary duty cycle value.

* * * * *